US011433567B2

(12) United States Patent
Volpato et al.

(10) Patent No.: US 11,433,567 B2
(45) Date of Patent: Sep. 6, 2022

(54) HIGH-PRESSURE MIXING DEVICE WITH SINGLE-PIECE DELIVERY DUCT

(71) Applicant: AFROS S.p.A., Milan (IT)

(72) Inventors: Marco Volpato, Milan (IT); Maurizio Corti, Milan (IT); Giorgio Molteni, Milan (IT); Fabio Fini, Milan (IT)

(73) Assignee: Afros S.p.A.

(*) Notice: Subject to any disclaimer, the term of this patent is extended or adjusted under 35 U.S.C. 154(b) by 127 days.

(21) Appl. No.: 16/826,631

(22) Filed: Mar. 23, 2020

(65) Prior Publication Data
US 2020/0307025 A1   Oct. 1, 2020

(30) Foreign Application Priority Data
Mar. 27, 2019 (IT) .......................... 102019000004603

(51) Int. Cl.
*B29B 7/76* (2006.01)
*B29B 7/74* (2006.01)

(52) U.S. Cl.
CPC .......... *B29B 7/7668* (2013.01); *B29B 7/7423* (2013.01); *B29B 7/7689* (2013.01); *B29B 7/7636* (2013.01)

(58) Field of Classification Search
CPC ... B29B 7/7668; B29B 7/7423; B29B 7/7689; B29B 7/7636; B29B 7/7404; B29B 7/7652; B29B 7/7694; B29B 7/7684; B29B 7/7647; B29B 7/74; B29B 7/28; B29B 7/7471; B29B 7/7615; B29B 7/801; B29B 7/802; B29C 67/246; B29C 45/18; B29C 45/46; B29C 69/00; B01F 13/06; B01F 15/00032;
(Continued)

(56) References Cited

U.S. PATENT DOCUMENTS 4,442,070 A    4/1984  Proksa et al.
9,308,512 B2 * 4/2016  Fiorentini ............. B29B 7/7404
(Continued)

FOREIGN PATENT DOCUMENTS

DE      2065819 A1    6/1976
DE      4214404 A1   11/1993
(Continued)

*Primary Examiner* — Charles Cooley
(74) *Attorney, Agent, or Firm* — Laubscher & Laubscher, P.C.

(57) ABSTRACT

A high-pressure mixing device adapted to form a polymeric mixture from the reaction of two or more reactive liquid components or resins, comprises a head-body with a mixing chamber having an inner cylindrical surface with inlet and outlet openings for injecting and recirculating reactive components; a duct for delivering the mixture, a valve body with recirculation longitudinal slots; the delivery duct, of the self-cleaning type, is a single-piece tubular element, insertable into a hole passing through the head-body, having an intermediate transversal hole aligned with the mixing chamber with a diameter greater than a diameter of the mixing chamber for avoiding protrusions of the walls of the transversal hole from forming inwardly of the mixing chamber of the head-body. Sealing elements duly arranged between the coupling interfaces of the various components prevent the leakage of polymeric mixture and lubricant liquid. There is also disclosed a related method.

23 Claims, 20 Drawing Sheets

(58) Field of Classification Search
CPC .. B01F 15/026; B01F 3/10; B01F 5/04; B01F 33/70; B01F 35/12; B01F 35/1453; B01F 35/71805; B01F 23/47; B01F 25/30; F16K 3/0209

See application file for complete search history.

(56) References Cited

U.S. PATENT DOCUMENTS

| | | | |
|---|---|---|---|
| 9,731,267 B2* | 8/2017 | Fiorentini | B01J 19/0073 |
| 2008/0128209 A1* | 6/2008 | Fiorentini | B29B 7/7404 |
| | | | 184/6 |
| 2015/0174540 A1* | 6/2015 | Volpato | B29B 7/7668 |
| | | | 366/162.5 |
| 2020/0307024 A1* | 10/2020 | Volpato | B29B 7/801 |
| 2020/0307025 A1* | 10/2020 | Volpato | B29B 7/7404 |

FOREIGN PATENT DOCUMENTS

| | | |
|---|---|---|
| EP | 2767376 A1 | 8/2014 |
| GB | 2488125 A | 8/2012 |

* cited by examiner

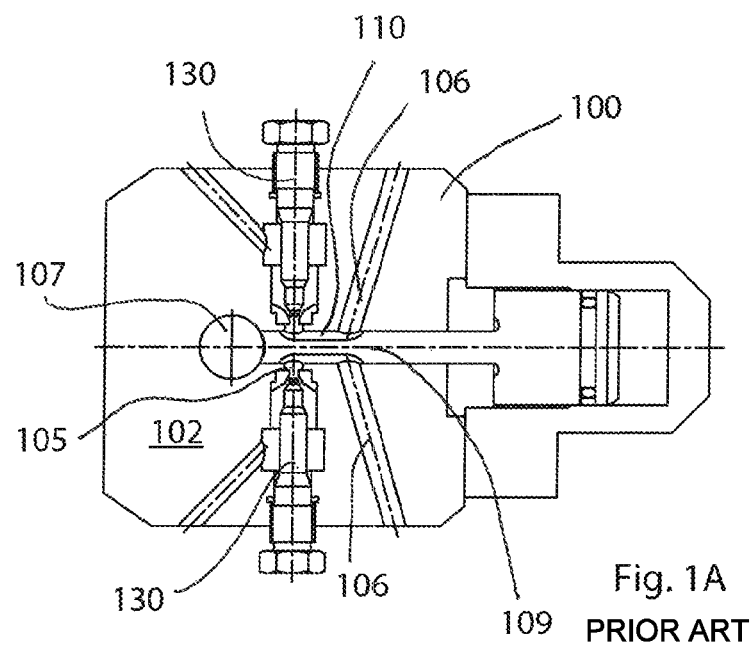
Fig. 1A PRIOR ART
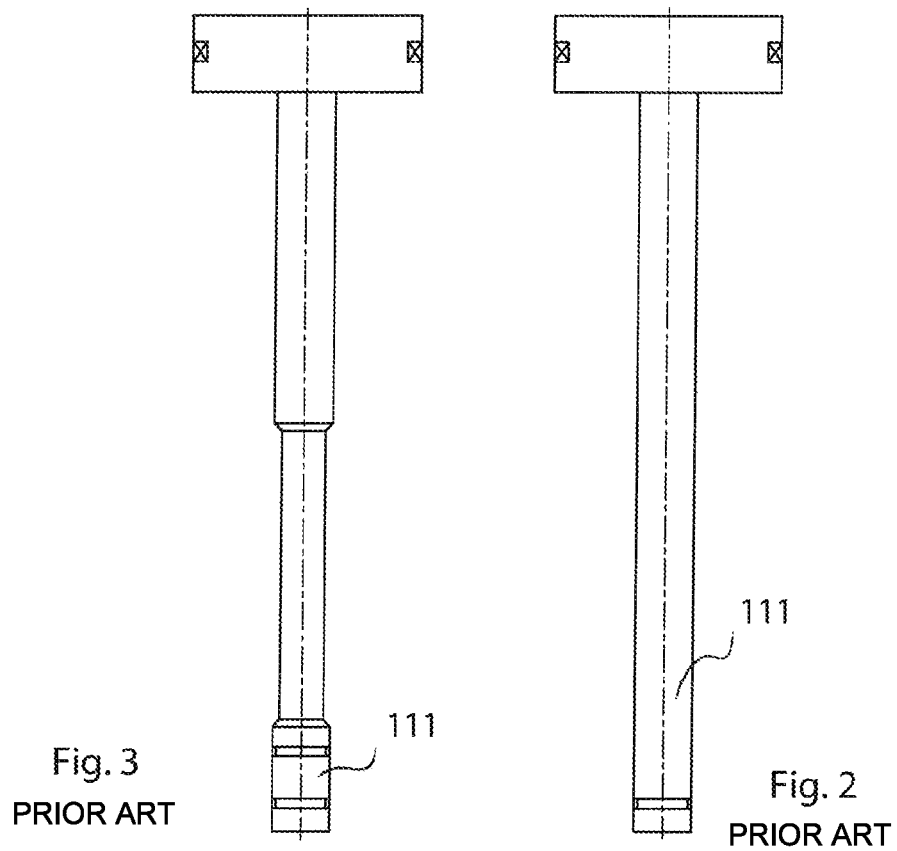
Fig. 3 PRIOR ART
Fig. 2 PRIOR ART

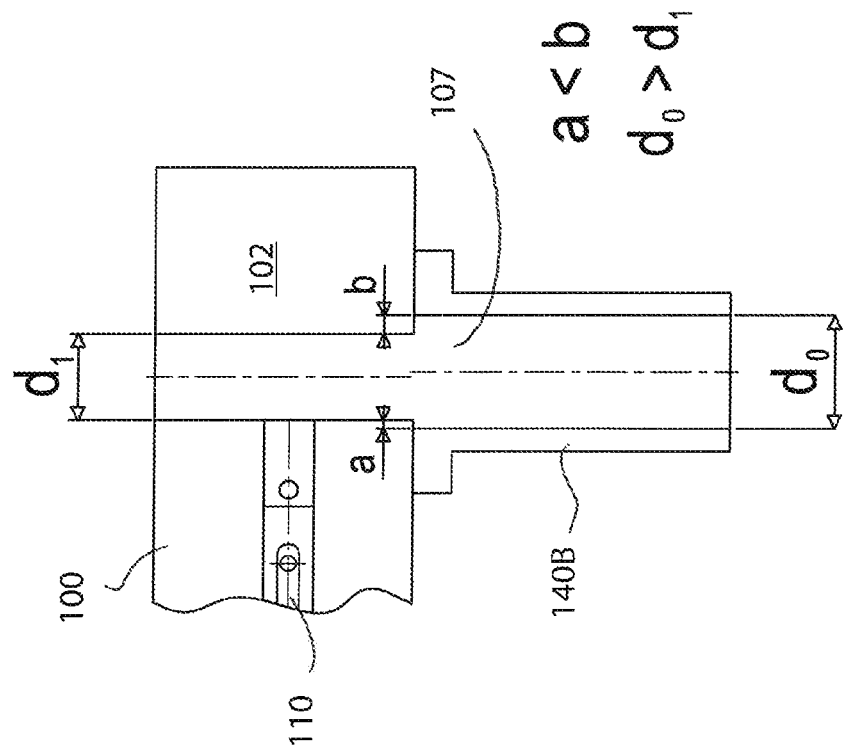
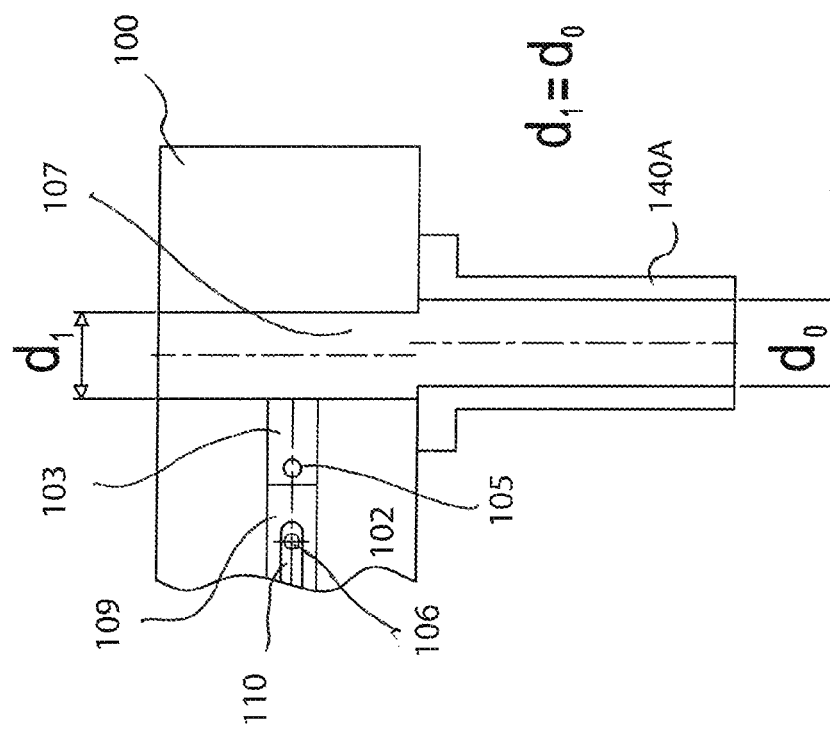
Fig. 5
PRIOR ART
Fig. 4
PRIOR ART $d_1 = d_0$

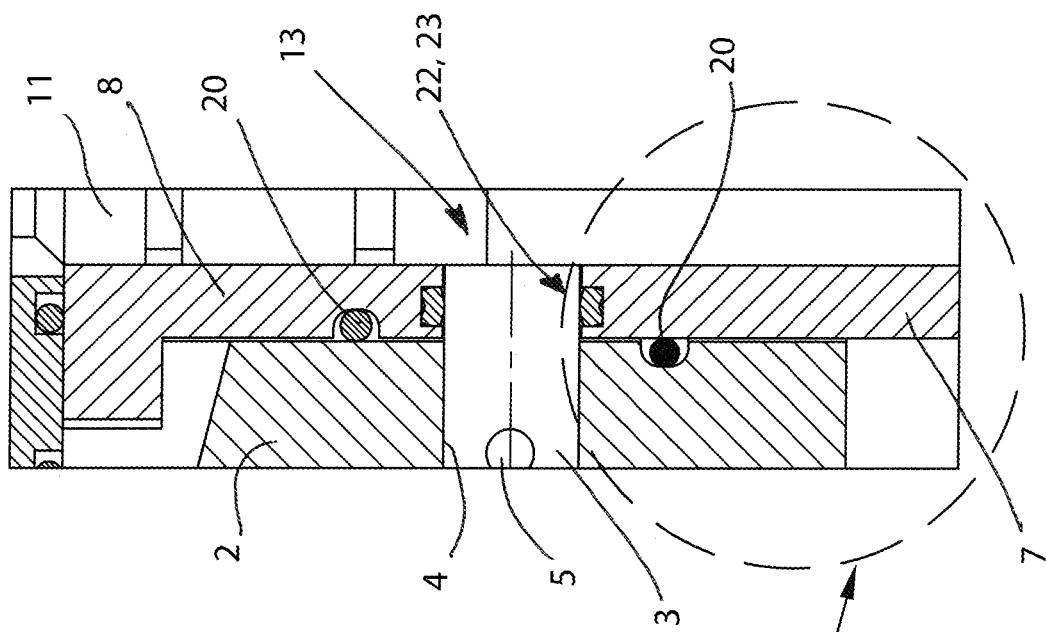
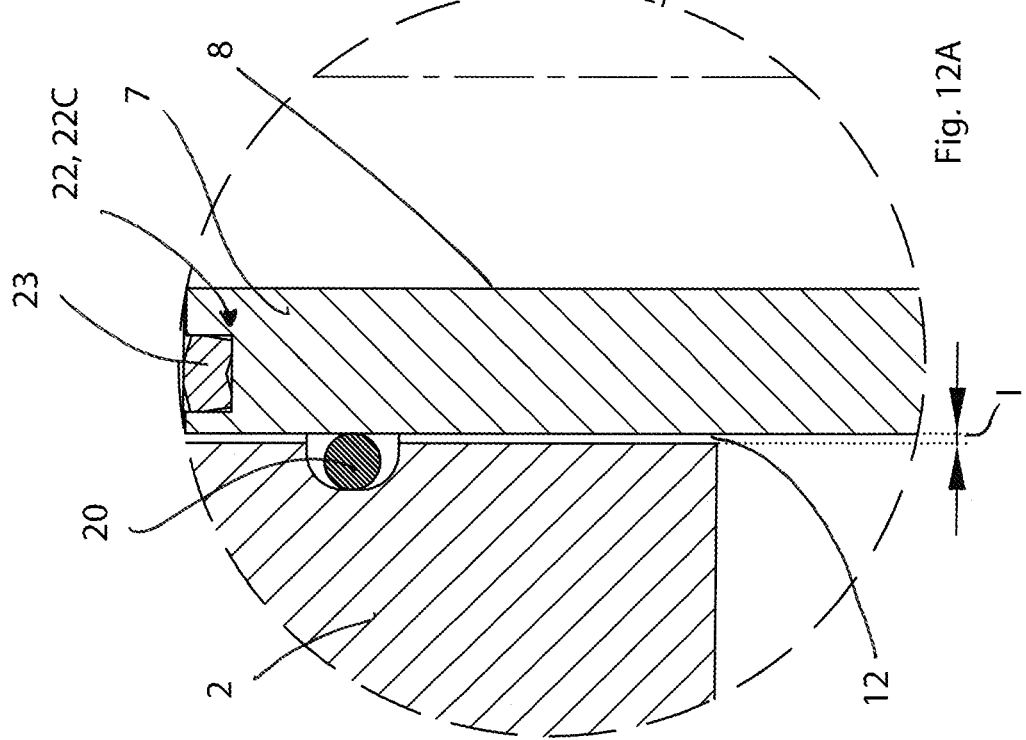
Fig. 12
Fig. 12A

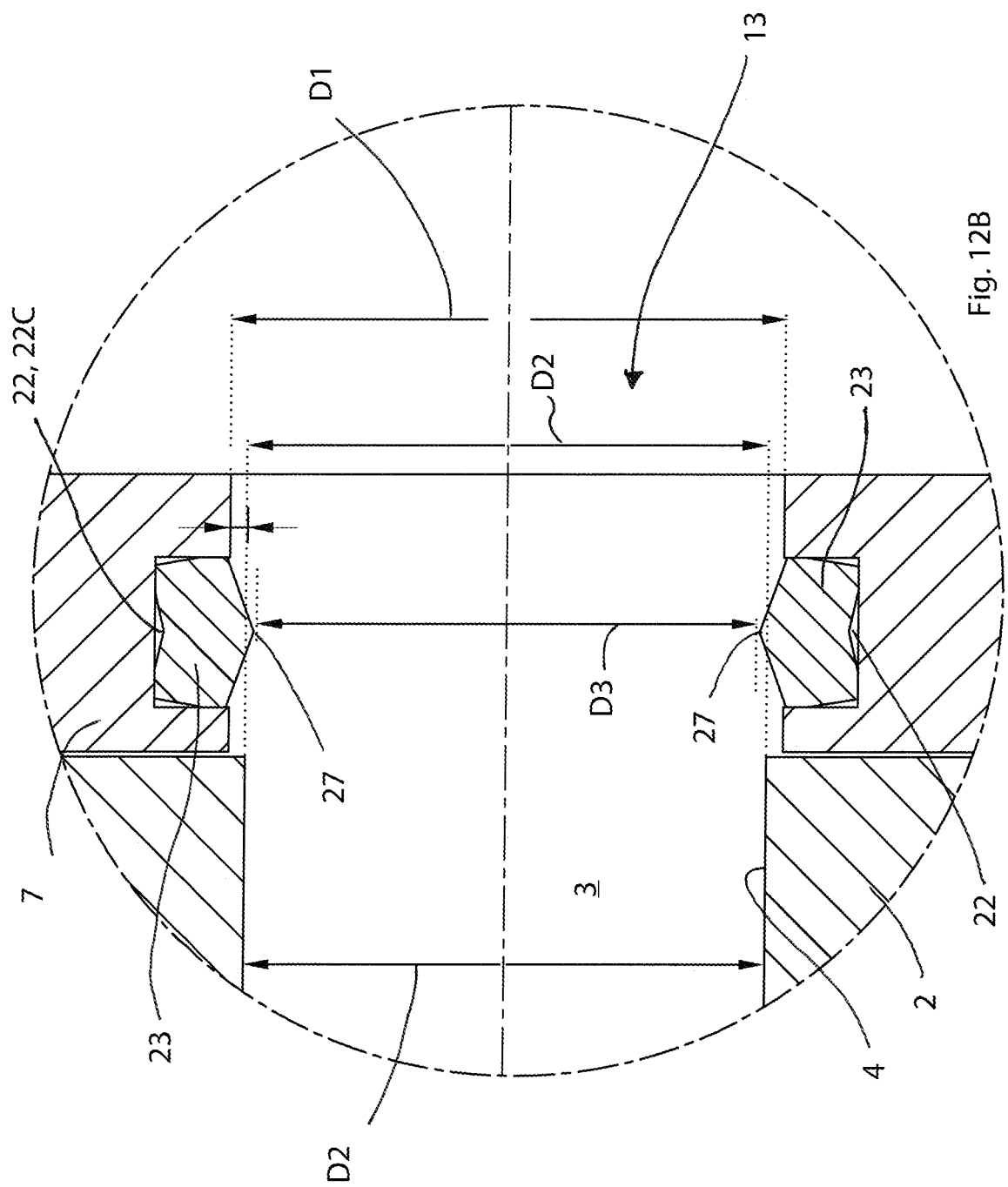

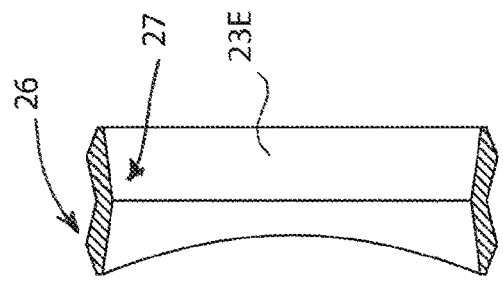
Fig. 19
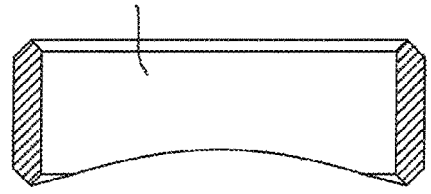
Fig. 20
Fig. 21
Fig. 22
Fig. 23
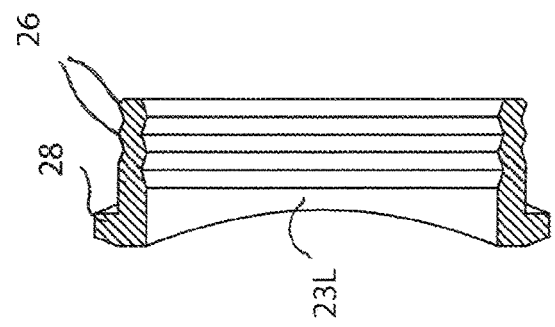
Fig. 24
Fig. 25
Fig. 26
Fig. 27
Fig. 28

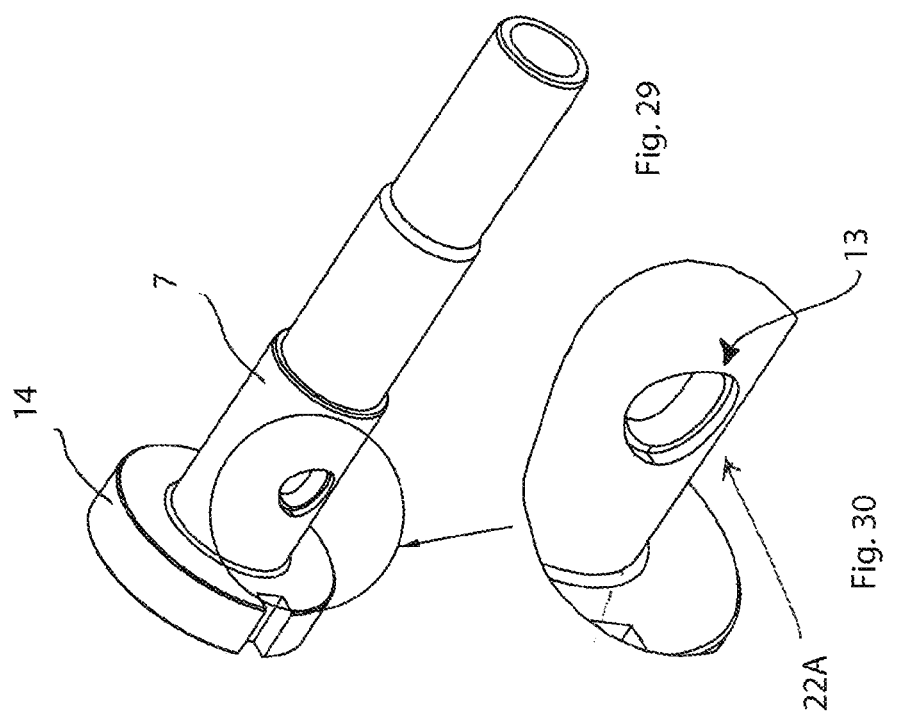
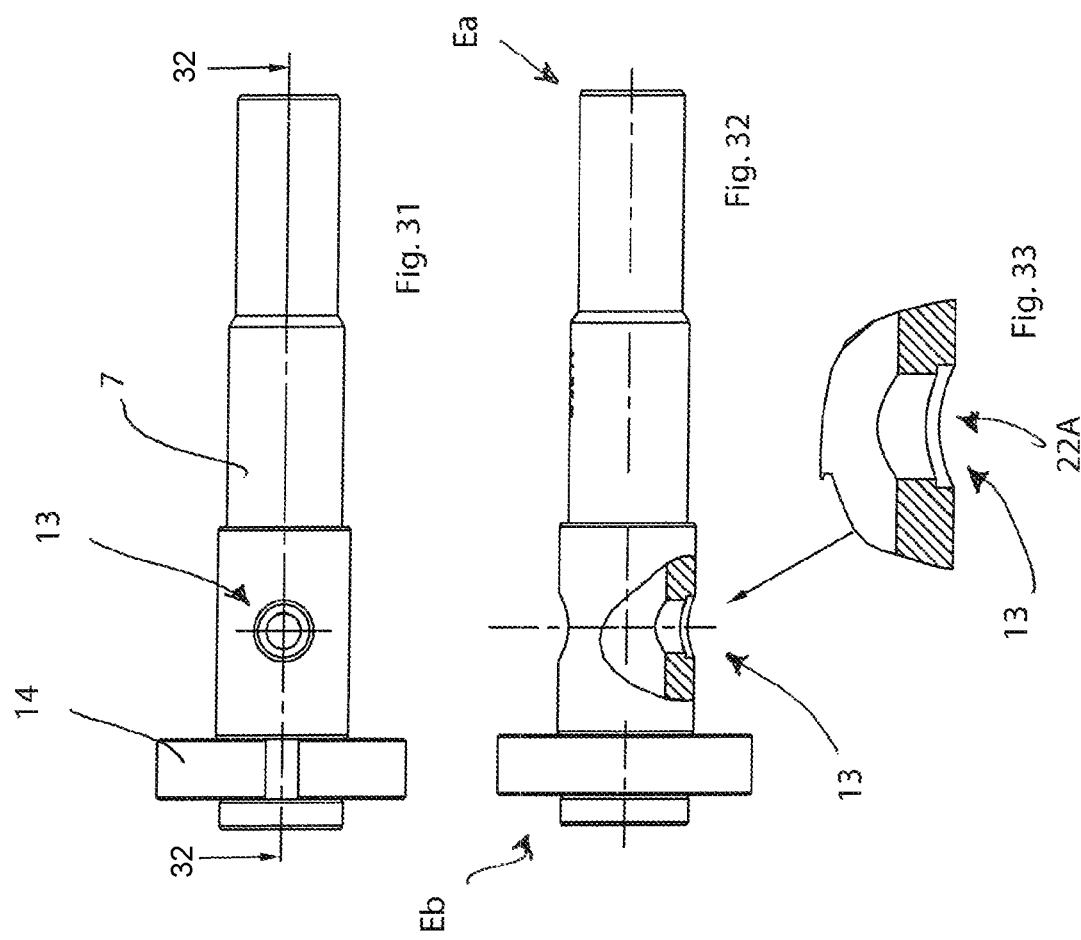

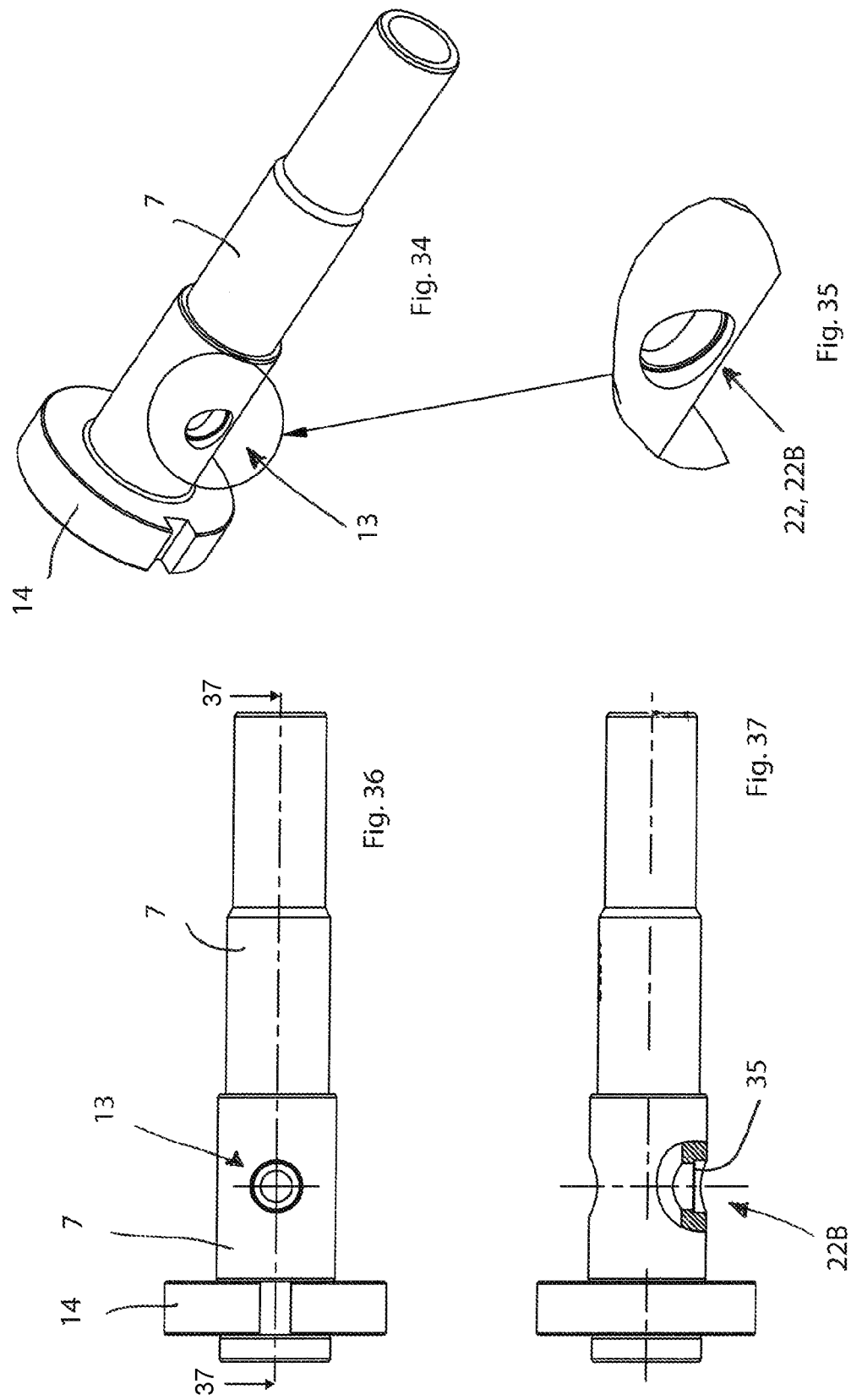

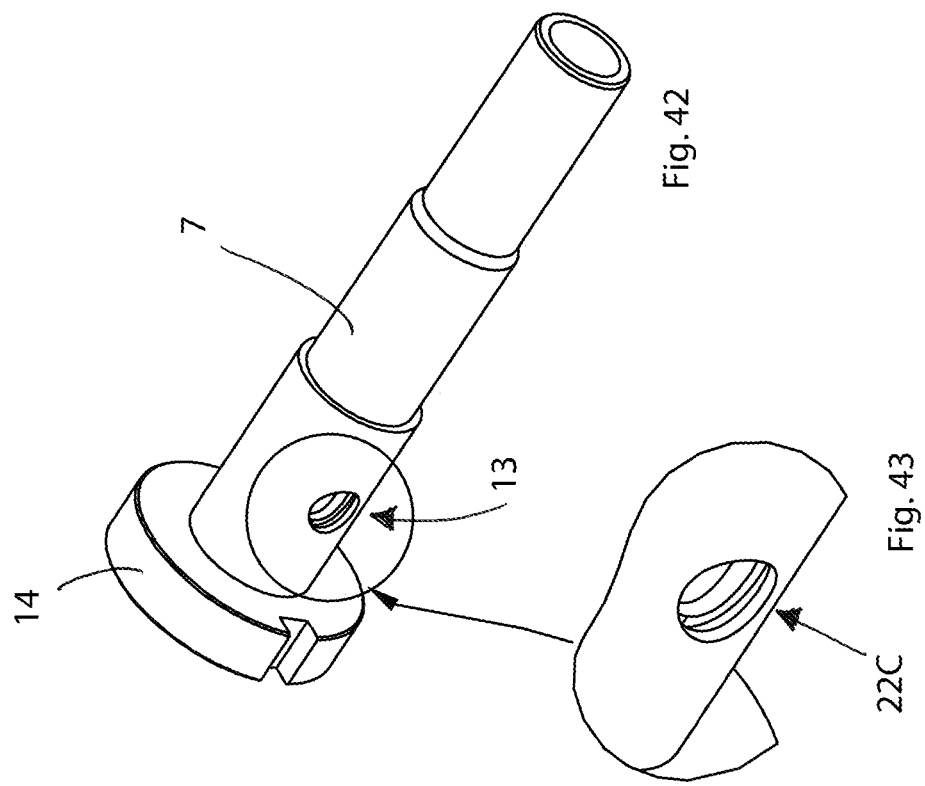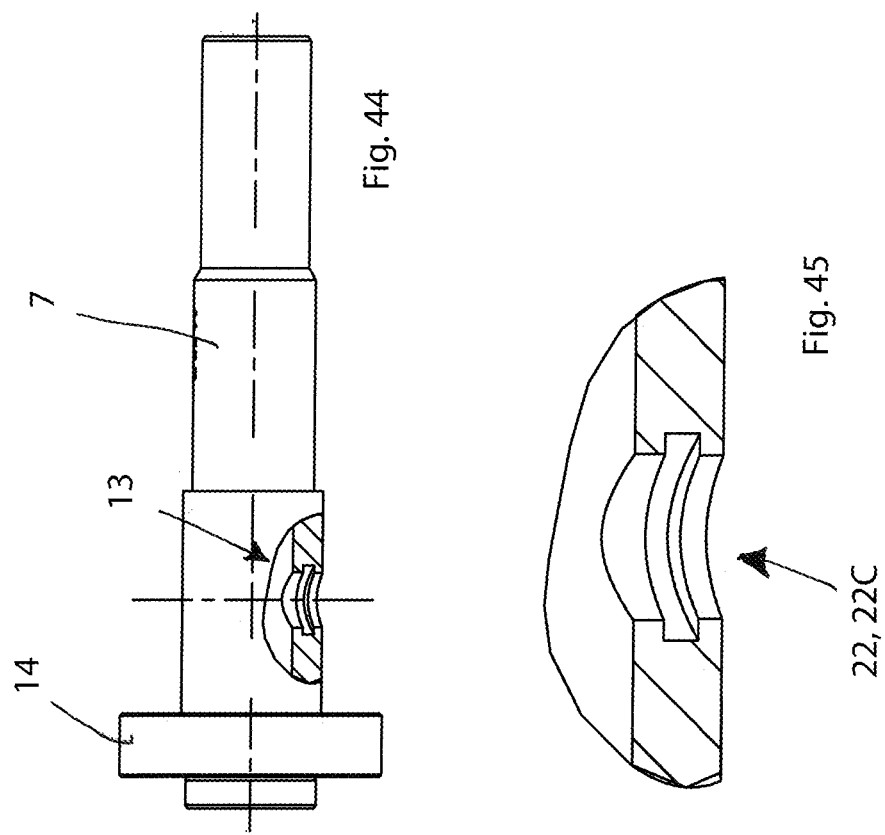

HIGH-PRESSURE MIXING DEVICE WITH SINGLE-PIECE DELIVERY DUCT

BACKGROUND OF THE INVENTION

The present invention relates to a device for mixing at a high-pressure liquid polymeric components or reactive resins for forming a reacting polymeric mixture intended to be poured or injected to produce various objects. The mixing device according to the invention is able to process a polyurethane, epoxy, vinyl ester, polyester, silicon and phenolic resin.

STATE OF THE ART

Mixing apparatuses are known in the art, in particular high-pressure self-cleaning L-shaped mixing heads, adapted to mix polymeric components such as to obtain reacting chemical mixtures intended to be injected or delivered into a mould. Chemical mixtures originate from the impingement of at least two jets inside a circular-section cylindrical chamber referred to as mixing chamber.

FIG. 1 shows a known "L-shaped" self-cleaning mixing head 100, some parts of which are also shown in FIGS. 1A, 2, 3, 4 and 5.

Before being sent into the mixing chamber 103 obtained in the head-body 2, the polymeric components are dosed at a stoichiometric ratio and at high-pressure by means of volumetric dosers, performing a monitoring in a closed loop by means of suitable flow rate transducers.

The polymeric components, duly dosed, reach the mixing head where suitable injectors 130, transforming the pressure energy into kinetic energy of the jets, inject them into the mixing chamber 103 where the mixing occurs by impingement of respective jets and as a result of the induced high turbulence.

The reacting mixture originated from mixing the jets subsequently flows towards a cylinder-shaped delivery duct 107, placed orthogonally with respect to the mixing chamber 103, that deviates the mixture flow and reduces the turbulence thereof as far as the final outlet mouth.

The term "L-shaped head" is generally used to indicate this specific type of heads whose configuration is determined by the mutual spatial arrangement of the two ducts, i.e. the mixing chamber 103 and the delivery chamber or delivery duct 107 that extend orthogonally one with respect to the other.

In each of the aforementioned chambers there are slidingly movable elements suitable for scraping and ejecting the reacting resin (valve member or mixing slide valve 109, and cleaning member or stem 111 respectively, shown in FIGS. 2, 3, described in the following) whose respective movements must occur in sequence both for the delivery and the subsequent ejection of the end volume of reacting resins.

In the mixing chamber 103, having circular section, two or more injection holes 105 (associated with respective injectors 130) are faced, placed nearer to the front zone, i.e. towards the part flowing into the delivery duct 107, and through which the jets of reactive resins are supplied, and two or more respective recirculation holes 106 placed at the back and longitudinally in axis with the aforesaid injection holes 105 placed further onwards, and whose function is to allow recirculation of reactive resins towards the respective storage tanks.

Inside the mixing chamber 103 the aforesaid valve member, or mixing slide valve 109, is slidingly movable, provided with longitudinal slots 110 for the separate recirculation of the resins; such slide valve 109, during advancing, also performs the cleaning of the mixing chamber 103 by ejecting the residues of mixed resins.

The valve member 109, hydraulically controlled by means of a cylinder, is reciprocal between a backward opening and mixing position, and an advanced closure and recirculation position.

When the valve member 109 is taken to the advanced closure position, its recirculation slots 110 face the injectors 130 and convey the flows of the respective resins backward towards corresponding recirculation holes 106 made in the body 102 of the head, where, through specific ducts, the resins flow back towards respective tanks from which they were taken and dosed under pressure.

In the backward or opening position, injection holes 105 are exposed, and the resin jets flow into the mixing chamber where they can collide against one other or against the walls of the chamber to mix mutually by strong turbulence in few milliseconds.

The valve member 109, therefore, acts as an hydraulic member which performs one first step of recirculating the reactive resins keeping them separated, by means of recirculation slots 106, one subsequent second step, when it is retracted to expose the injection holes, in which jets are allowed to impact mutually and against the walls of the mixing chamber 103, creating a necessary turbulence condition so as to obtain a rapid and thorough mixing of the same resins, and one third step of interrupting the mixing, during which the valve member 109 is again advanced to return the slots at the jets making the resins recirculate separately; at the same time, in the advancement movement, the valve member ejects the volume of mixed resins from the mixing chamber 103 towards the delivery duct 107, the latter being also referred to as "self-cleaning duct" due to the presence of the cleaning member or stem 111 reciprocatingly movable therein.

The slots 110 therefore perform recirculation and keep the reactive resins separated during the operating step in which they must not be mutually mixed but they must on the contrary be dosed under pressure and kept separated in order to allow to set the dosing parameters i.e. the correct ratio between the reactive components, the pressure reached by the injectors and to maintain the recirculation pumping thereof to stabilize the essential parameters of the process such as temperature, pressure, ratio and dispersion of possible charges or expansion agents.

The front section of the valve slide 109 is cylindrical, solid and cavity-free and it is coupled with a clearance of few micrometres with the mixing chamber to act as a scraper and ejector in the advanced closure position, and not to allow resins flow towards the self-cleaning duct 107 when the valve slide is closed to perform recirculation, as schematized in FIG. 1A.

Usually the movement of the valve slide 109 is very rapid and its front solid cylindrical part intercepts the jets of reactive components for a very short time while passing in front of the injectors while the valve slide is retracted to enable mixing; the injection holes are again "blinded" for a very short time when the valve slide advances to switch from the mixing position to the recirculation position.

During the recirculation step, the pumps that dose the reactive resins take the different flows to the flow-rate regime without mixing the reactive resins with one other while injectors adjust pressure through hydraulic throttles normally made on the nozzles outlet holes.

Thereby failure by the different flows to reach the correct stoichiometric ratio during the first mixing and delivery step is prevented.

The reacting polymeric mixture, while flowing from the mixing chamber 103 and then through the delivery duct 107, starts polymerizing and a gradual reduction of the mixing turbulence along the aforesaid duct 107 occurs.

A cohesive jet can outflow from the end of the delivery duct 107 if the loss of turbulence is sufficient otherwise there is still a jet affected by rotation motions and turbulence events.

It is desirable to have an outlet cohesive jet to ensure a correct process for foaming and filling the mould and to obtain high quality products.

The aforementioned cleaning and closure member, also called self-cleaning stem 111, hydraulically controlled and sliding along the delivery duct 107, acts in sequence to the closure of the mixing slide valve 109 to eject the reacting resin and keep the duct duly clean, scraping away the residues of resin of the delivery chamber and scraping away also the residues that have adhered to the front end of the slide valve 109 when the latter is completely advanced and in flush position with the inner surface of the delivery duct 107.

The self-cleaning stem 111 can have a cylindrical shape with constant diameter throughout its longitudinal extension (straight stem in FIG. 2), or have a cylindrical scraping head coupled with the delivery duct with reduced clearance, while the control stem portion has a section with smaller diameter compared to the diameter of the scraping head such that it does not slide with pressure contact on the thin layer of reacted resin that forms on the inner surface of the delivery duct (hammer-shaped stem with scraping head in FIG. 3). Both the aforesaid scraping cylindrical sections are coupled to the delivery duct with reduced clearance.

It is important to ensure a high geometrical precision and very limited clearance in the couplings between the various components, for example between the valve slide 109 and the mixing chamber 103 and between the head of the self-cleaning stem (cleaning member) and the delivery duct 107. This aims at ensuring efficacy in scraping the residual resin away from surfaces wetted thereby; the resin in fact, after each recirculation cycle, gradually accumulates in the form of a reacting adhering thin layer that polymerizes and hardens rapidly by bonding at the surfaces of the respective chambers.

The above described high-pressure mixing heads have the drawbacks and the limits hereinafter set forth.

In particular, problems relate to the three following factors: the bonding effect exerted by the reacted or reacting resins at the interface between the surfaces of fixed walls and the surfaces of movable elements on which they stratify, the leakage of resins (when still in the liquid phase they are mixed or not yet mixed or in the reaction phase) through the meatuses or the clearance of elements acting to separate and partition the resins thereof, and the wear affecting sealing elements during the operation, currently even more exacerbated by frequent cycles and high speeds.

In use, in the mixing head 100, thin layers, or thin films of reacted resins form in the clearance gaps between the movable elements and the respective chambers where they slide, i.e. between the slide valve 109 and the mixing chamber 103, but in a more significant and continuous way, between the self-cleaning stem 111 and the delivery duct 107. Such thin layers of reacting resin, initially in the liquid state, polymerize rapidly in a few tens of seconds and after some hundreds of delivery cycles they form well adhering layers that have a high bonding capacity on the surfaces.

The layers of polymer resin tend to accumulate both on the movable members and on the walls of the chambers where they slide. This occurs rapidly and systematically for the self-cleaning duct, while, in the case of the mixing chamber, the event of accumulating and stratifying the reacted resin is less rapid as it is contrasted by the washing effect performed both by the non-mixed resins sliding into the respective slots during recirculation and by the leakage of non-mixed resins along clearances between mixing slide valve and chamber both due to pressure differences between recirculation slots and to the inlet of jets of reactive components at high speed and under pressure.

Referring in particular to the self-cleaning duct, problems do not occur as long as movable members are able, by their own movement, to remove such hardened resin from the surfaces taking away parts thereof in the form of rolls or plates or strands. The operation becomes more critical when such layers start accumulating on the surfaces and particularly in a differentiated way on a side of the chambers overlaying one on the other: in this case the movement of the movable scraping members is no longer able to uniformly remove polymerized layers of resin accumulating on a longitudinally-extending zone where they stratify more and more while the strong pressure causes the total scraping of the layer on the opposite side where the scraping part tends to slide with metal-on-metal contact on the surface of the duct. On both sides of the duct the strong pressure occurring during the sliding causes such compression and friction that they generate a strong heating and then damage due to surface seizure in the metal contact zone.

The stratification phenomenon generally occurs on all the surfaces coupled with mutual movement but with very different effects depending on the duct submitted to the self-cleaning action which is taken into consideration. For example, the layer of resin which deposits on the walls of the mixing chamber 103 and on the cylinder surfaces of the slide valve 109 and slidingly coupled thereto, is mostly flushed by virtue of the effect of the recirculation of the resin occurring before and after each delivery cycle and by virtue of the passage of the front cylindrical section of the slide valve in front of injectors. As regards the slide valve 109, a layer of reacted resin forms that mainly affects the front part perpendicular to the longitudinal axis thereof, having a saddle-shaped geometrical conformation and facing the self-cleaning delivery duct 107. The formation of a layer of reacted resin affects very little the cylindrical surfaces of the slide valve 109 (slidingly coupled to the mixing chamber 103).

Generally, the layer of reacted resin forms on the cylindrical surfaces of the slide valve only after long interruptions during which the slide valve itself remains in the closed position. The resin layer is however removed during the working cycle by the flows of non-mixed resins which have a washing effect.

During the opening and closing movement of the slide valve 109, injectors 130 are very closed to the slide valve 109 and thereby the jets of resin, compressed in the interposed meatus, cause a sudden and rapid washing action.

Similarly, on the surface interposed between the recirculation slots 110 of the slide valve 109, the layer hardly forms and it is flushed due to the action of a small quantity of resin (usually the most viscous) which tends to flow towards the slot 110 of the less viscous resin by virtue of the pressure difference between the two slots 110.

Therefore, the layer of polymerized resin rarely forms on the surfaces of the slide valve 109, while, on the walls of the mixing chamber 103, the layer forms only in the junction ravines or in recesses or gaps specifically obtained and on the inner circumference of the hole 13 facing the self-cleaning duct.

By contrast the layers of reacted resin that form both on the surfaces of the self-cleaning stem 111 and on the walls of the respective delivery chamber 107 are difficult to remove completely by the scraping action of the self-cleaning stem 111 during its sliding movement.

Sharp-corner fronts of the self-cleaning stem 111 cannot totally remove the reacted resin by scraping the layer during the opening and closing sliding operations but they remove a part and press what remains thereof.

The surface layer or thin layer is scraped-off by a combination of mechanical actions forming the scraping-off effect of the resin thickness encountering the corners of the self-cleaning head 111. The layer of resin is partly removed by a real shear action of the surface of resin reacted or being reacted, while a certain thickness—higher than the one of the clearance defined between the self-cleaning head 111 and the delivery chamber 107—is not sheared but it is first of all squeezed by the passage of the self-cleaning head 107 and then removed in subsequent passages by compression and subsequent rolling together with the removal of flakes of the thin layer of polymer compressed and dragged by the movement.

However, a thin layer of reacted resin remains adherent to the surface of the self-cleaning delivery duct 107; such thin layer, when it is still liquid, spreads along all the surface itself, but it tends to remain bonded thereto accumulating only in some areas that extend mainly longitudinally and only at some angular positions with respect to the radial extension.

The thin layer of resin that remains adherent is strongly compressed, during the passage of the scraping head of the self-cleaning stem, and opposes to the scraping action as it adapts elasto-plastically such that a complete removal is avoided; at the same time, the resulting compression force amplifies the force due to the friction which opposes to the sliding of the self-cleaning head.

It was noted throughout various tests, and with greater evidence in applications with reacting resins that form stiff compounds (of both low and high density), when polymerised, that, when the "L-shaped" self-cleaning head 100 is in function, especially after some tens of thousands of self-cleaning cycles, resins start to form a thicker layer on a side of the delivery duct 107 and that such a layer exerts on the head of the self-cleaning member or stem 111 a strong push towards the opposite side. It is a phenomenon that tends to self-sustain and intensify more and more; in fact the gradual increase of the thickness of the reacted resin that forms on a side causes at the same time a similarly clear increase of the pressure that the self-cleaning stem 111 performs on the opposite side where the compression force is able to remove the resin both by means of the front sharp corner of the self-cleaning stem 111 and by scraping-off and subsequently rolling and/or detaching flakes of resin chips that are formed in the relative motion under strong friction and compression conditions.

In other words, on an inner longitudinal stripe of the self-cleaning duct 107 a strongly compressed thin layer of resin forms occupying all the clearance between stem and duct while on the other opposite longitudinal surface, the high pressure and rubbing conditions hinder the formation of a resin layer and a metal-on-metal contact occurs.

Such problem has been known for long and occurs in the operating life after some thousands of deliveries. The phenomenon is however less clear and emphasized when the configuration of the self-cleaning delivery chamber 107 is composed of two separate and joined pieces and thus having a geometrical stepped discontinuity at the junction between the head-body 102 and the part joined thereto 140 of the protruding delivery duct or extension of the self-cleaning duct, as schematized in FIGS. 4, 5, 4B, 4C and 5A which show two possible constructive configurations currently adopted in the state of the art and two possible protruding conditions of the junction step.

The formation and configuration of the step depends on the tolerances and processing errors of the two parts if they are processed as separate and on the mutual sliding of the coupled parts caused by the strong and sudden heating and cooling generated by the friction and generated by the passage of resins during the working cycles which cause a mutual displacement of the parts even when the joined parts are already processed in a mutually assembled configuration.

In particular, FIG. 4 shows the junction step in a case when the two parts of the delivery duct, one being integral with the body-head 102 and the other being a distinct extension part 140A and fixed at the bottom by centering elements and screws, have a same nominal diameter, i.e. the hole in the head body has the same diameter as the hole present in the extension part (d1=d0).

In FIG. 5 instead it is shown another configuration of the junction step deriving from a constructive solution in which the extension part 140B is, in a version, configured with an inner hole of the extension part with a diameter (d0) greater than the respective diameter (d1) of the hole in the head-body (d0>d1). This solution is adopted to ease the alignment during the assembly avoiding a possible interference with the corners of the sliding self-cleaning stem 111. However, a step necessarily forms that can also be centered with respect to the axis of the duct 107, however it is usually shifted both during the assembly of the two pieces and due to shearing caused by thermal stresses.

The presence of a small step or misalignment higher than 5 micrometres is sufficient to cause an uneven accumulation of resin mainly in the largest section of the walls of the delivery duct 107.

Referring to FIGS. 5A and 4B, the abnormal accumulation of reacted resin can also depend on a tilt or lack of parallelism of the two joined parts (element 140 connected to the head body 102) that define the delivery duct; such a circumstance causes a different side pressure on the delivery duct surface when the self-cleaning head slides towards the lower part of the delivery duct where the reacting resin exits and emphasizes the accumulation of reacting resin on a side as previously described.

When the delivery duct is composed of two parts and has a step at the junction between them, the layer of reacted and compressed resin tends to accumulate in the area of the delivery duct where it is more likely to stratify, i.e. in the area overlooking the largest part of the step. Where the step has a greater protrusion thickness, a longitudinal stripe of accumulated resin layers forms on the cylindrical inner surface of the self-cleaning duct while, on the opposite side, the strong push given to the self-cleaning stem by the resin compressed at the opposite side, leads the self-cleaning stem itself to completely scrape the resin away and to generate the metal-on-metal sliding. This phenomenon, which is, as previously mentioned, self-sustaining, and the direct rubbing between metal surfaces, following the heat produced, unfortunately causes, undesired scratches and seizing.

Already with the first seized zones, the self-cleaning stem needs to significantly increase its strength to move along the delivery duct.

Such problem is extremely important as the damage of the surface of the delivery duct and self-cleaning stem due to seizing inevitably leads to the need to replace such an expensive and complex component as the mixing head, causing economic disadvantages due to production line interruption (necessary for the replacement operation) which lasts for not less than a few hours.

As it is impossible, or in any case extremely difficult to obtained delivery ducts with step-free zones, and with perfect axial alignment, due to too much expensive assembly requirements, the configuration of the delivery duct made of two joined pieces is the most commonly used on "L-shaped" mixing heads due to assembly rapidity and low constructive costs; however, the necessary presence of the aforesaid junction areas with inevitable resulting steps, as well as angular misalignments of axis with respect to holes, is the cause of the above discussed problems. This adds to the fact that very often, in the operating life of the mixing head, a mutual misalignment of the mutually joined parts occurs, and therefore, even if the junction initially has a step of irrelevant dimension, the step itself, as a consequence of the misalignment (due to thermal shock expansions and mechanical stresses) would assume relevant dimensions with the resulting above discussed consequences.

In the light of the above, we can thus list in the following some of the limits and drawbacks associated to the above described mixing heads 100:
- impossibility to prevent—in the delivery duct—junction zones which inevitably lead to stepped zones that are responsible for, or at least that strongly promote the formation of uneven layers of hardened resin, which adhere asymmetrically to the inner surface of the delivery duct; such layers cause seizure events that are detrimental for the self-cleaning stem and the delivery duct;
- difficulty in the assembly operation: in order to minimize the above-mentioned step zones, processing tolerances are sometimes very strict, and it is necessary to mutually align the various components with high precision, with an obvious increase in costs and time for assembling;
- the assembly costs and time are considerable not just when the self-cleaning head is being constructed but also during the operating life thereof, i.e. during the necessary periodical interventions for replacing components being damaged by seizure events (which are in any case unavoidable even with very strict working tolerances).

In the above described and discussed mixing heads, unfortunately, it is not possible to foresee and prevent asymmetric layers of hardened resins, responsible for the onset of scratches and seizure where the metal-on-metal contact occurs along the self-cleaning duct; these phenomena submit mixing heads to conditions of severe wear during operation ad inevitably force to replace the concerned pieces, composed in these cases of both head-body and extension of the self-cleaning duct, with obvious additional maintenance expenses and inevitable machine interruptions which are economically detrimental.

Many of the above described problems were successfully overcome by means of a self-cleaning head solution, operating brilliantly and disclosed in Patent EP2767376 to the Applicant.

OBJECTS OF THE INVENTION

Even though such recent solution has significant advantages compared to the above described apparatuses, an object of the present invention is to provide a new improved solution, able to overcome all the drawbacks and problems previously set forth and also to make it possible to obtain further advantages.

In particular, an object of the present invention is to provide a solution that, in addition to reducing as much as possible the aforementioned damaging phenomena, thus sensibly elongating the operating life of the high-pressure mixing device, is also able to simplify and make it more cost-effective to construct, assemble and operate the device itself, even with lubricant in the spacer chamber, and make it easier, more rapid and cheap to replace the delivery duct and the self-cleaning member coupled thereto according to a configuration with reduced clearance and high geometrical precision.

In particular, an object is to provide an "L-shaped" high-pressure mixing device, configured such as to make it extremely simple and rapid to assemble and remove and replace for extraordinary maintenance the delivery duct already coupled with the respective self-cleaning member with suitable, even clearance with respect to the self-cleaning member and provided with a precise geometry throughout the extension of the delivery duct, further facilitating both the axial and longitudinal centering and the angular orientation of the delivery duct with respect to the seat of the head-body housing it and with respect to the cylindrical hole of the mixing chamber, compensating for possible processing errors and size imprecisions.

It is thus desired to provide a technical solution such as to simplify and make the construction of the device more cost-efficient, implementing the entire delivery and self-cleaning duct with high geometrical precision and junction-free, making it easier, more rapid and cost-effective to couple it to the self-cleaning head with reduced clearance and to replace the only delivery duct and the self-cleaning member with no need to replace also the head-body.

In particular, an object is to provide an "L-shaped" high-pressure mixing device composed in such a way that it is extremely easy and rapid to assembly and replace, for extraordinary maintenance purposes, the delivery duct already coupled with the respective self-cleaning member with a suitable, even clearance and with a precise geometry. In particular, an object is to provide a construction solution provided with high levels of general geometrical precision, precision for coupling the delivery duct and the cleaning member, thanks to the higher dimensional and geometrical precision offered by the new configuration of single-piece delivery duct.

One further object is to provide a technical solution that allows to produce and house the delivery duct in the respective seat of the head body such as to ease both the axial and longitudinal centering and the angular orientation of the delivery duct with respect to the seat of the head body housing it and with respect to the cylindrical hole of the mixing chamber, easily compensating for possible processing errors and dimensional imprecisions.

One further object of the present invention is to provide a solution that still improves and makes the sealing action immediate, soon after the installation, against leakages along the walls inside the hole housing the tubular element composing the delivery duct and along the front cylindrical surface of the mixing slide valve of both reacting mixture and lubricant liquid which it is often filled in with, fluxing it continuously by means of a pump dispenser, the spacer chamber separating the hydraulic control cylinder of the stem from the head body.

As it will be clear form the description, the spacer chamber is for collecting chips of reacted resin that the movement of the self-cleaning stem scrapes and transfers into the chamber itself when it opens towards it. The forced lubrication, when applied, removes said chips and further enters lubricant in the self-cleaning duct reducing friction, delaying the reaction of the thin layer of resin and thus facilitating its operation for millions of cycles.

The input of lubricant liquid into the spacer chamber also inhibits the formation of reacted resin in the sections coupling the bushing with the head body and into the hole that extends the mixing chamber in the bushing. This additional problem is solved by the sealings provided according to the present invention.

One further object of the present invention is to provide a solution that further improves the sealing action against leakage of reacting mixture between the delivery duct and the head-body.

One further object of the present invention is to provide a solution that further improves and makes the sealing action immediate against the leakage both of reacting mixture and lubricant liquid, (stationarily present or let forcedly flown in a spacer chamber for lubricating the self-cleaning stem as it will be clear from the following description) which must be kept apart from the mixing chamber.

BRIEF DESCRIPTION OF THE INVENTION

The above can be obtained by means of a mixing device according to claim 1.

Thanks to the invention all the predefined objects are achieved.

The achievement of the aforesaid objects is made possible thanks to:
- the delivery duct made in a single piece, thus obtained with a high dimensional and geometrical precision throughout its extension, having a precise geometrical configuration, having an even and precise clearance with respect to the self-cleaning member and housed, with a reduced clearance, inside its own seat obtained in the head body,
- the diameter of the intermediate hole that is greater than the diameter of the mixing chamber,
- sealing elements duly arranged between the coupling interfaces of the various components.

All these characteristics together allow to make the assembly of the various components immediate, avoiding laborious adjustment operations, also avoiding the expensive pre-resin-sealing (or prior application of hardening resin) of the mixing chamber extension both when first installed and when replacing the tubular delivery element.

In particular, it is easier and more rapid to insert the single-piece delivery duct—defining the delivery duct in the transversal pass-through hole of the head-body— in a sufficiently longitudinally, transversally and also angularly aligned position, significantly removing the complicated and time-consuming pre-positioning operations and subsequent necessary processes to adjust possible misalignments at the interface between assembled parts. Above all, it is avoided the application of preliminary sealing layers by means of slow-reaction hardening resins in the recesses of the hole extending the mixing chamber into the tubular element and in the clearance between the latter and the head body.

The sealing elements on the intermediate hole (made on the delivery duct element), keep the front portion of the valve member sealed and separated from the tubular delivery element, and the sealing elements on the cap (housed in the transversal hole placed diametrically opposite to the mixing chamber, in front of the valve member) act to seal and insulate the tubular element with respect to the opposite part of the head body, avoiding undesired leakages of mixture and/or lubricant.

BRIEF DESCRIPTION OF THE DRAWINGS

All the features of the mixing device according to the present invention will be more apparent from the following description, and from the enclosed drawings related to some embodiments.

FIG. 1A is a plan section view of the body of the "L-shaped" mixing head of the state of the art;

FIGS. 2 and 3 show two different types of self-cleaning stem provided inside a mixing head;

FIGS. 4 and 5 schematically show two different types of steps that are generated at the junction interface between the head body and the elongated protrusion which together define the delivery duct;

FIG. 12 shows an enlarged portion of one version of the device;

FIG. 12A is a further enlarged detail of FIG. 12, in which sealing elements can be better seen, in particular the sealing element placed at the intermediate hole obtained on the tubular delivery element and the sealing element between the tubular delivery element and pass-through seat obtained in the head-body;

FIGS. 12B and 12C are schematic enlargements of the interface zone between delivery duct and mixing chamber according to the invention, in which a sealing element respectively not in contact and in contact with a valve member is well visible;

FIGS. 19 to 28 show other possible versions of the sealing element according to the invention.

FIG. 29 shows a version of tubular delivery element according to the invention, having a transversal intermediate hole in which a seat is obtained, made by a counter bore, configured for housing a saddle-shaped sealing element with constant section;

FIG. 30 is an enlarged detail of the hole with sealing seat of FIG. 29;

FIG. 31 is a side view of the tubular element of FIG. 29;

FIG. 32 is a longitudinally partially sectioned view of the tubular element of FIG. 29 taken along line 32-32 of FIG. 31;

FIG. 33 is an enlarged detail of FIG. 32 showing, with a section view, the transversal hole with saddle-shaped sealing seat with constant section;

FIG. 34 shows a version of a tubular delivery element in whose intermediate hole a seat is obtained, for the relative sealing element, which is saddle-shaped outwardly while the inner shoulder region has the shape of a flat ring, obtained by counter bore;

FIG. 35 is an enlarged detail of the hole with sealing seat of FIG. 34;

FIG. 36 is a side of the tubular element of FIG. 34;

FIG. 37 is a longitudinally partially sectioned view of the tubular element of FIG. 34, taken along line 37-37 of FIG. 36;

FIG. 42 shows one version of tubular delivery element according to the invention, whose seat, obtained on the intermediate hole, for the sealing element has a configuration with constant section and a saddle shape entirely comprised in the thickness of the tubular element itself;

FIG. 43 is an enlarged detail of the hole with sealing seat of FIG. 42;

FIG. 44 is a longitudinally partially sectioned view of the tubular element of FIG. 42;

FIG. 45 is an enlarged view of FIG. 44 showing the sectional transversal intermediate hole with the sealing seat.

DETAILED DESCRIPTION OF THE INVENTION

Figure 1:
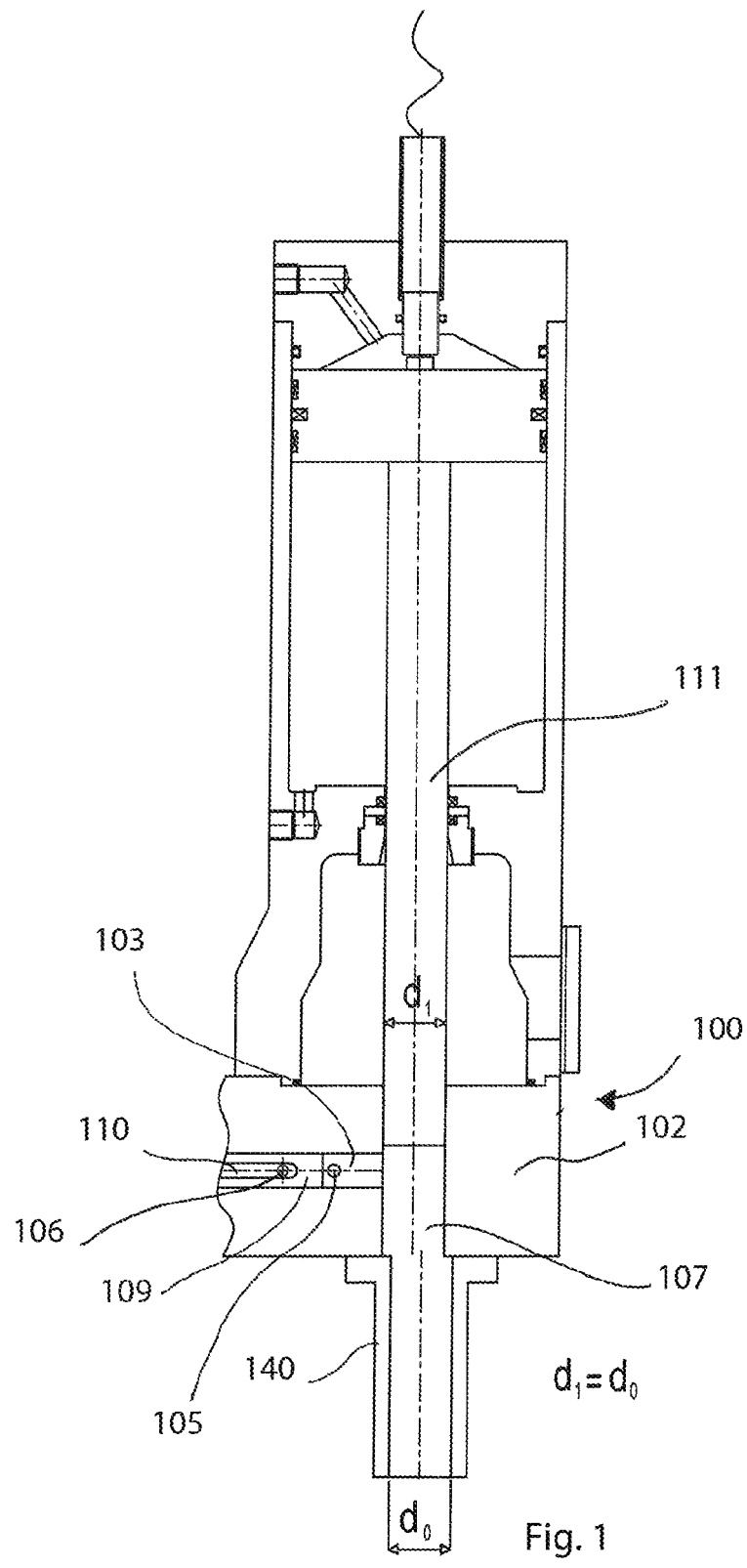
FIG. 1 shows an "L-shaped" mixing head of the state of the art.
Figure 4B:
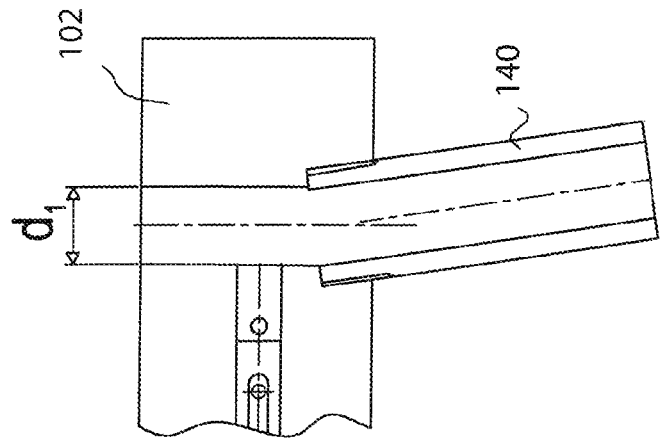
FIGS. 4A and 4B show a known assembly configuration of the delivery duct respectively affected by one first incorrect non-centered positioning condition and by one second incorrect misalignment condition wherein the axis of the zone of the elongated protrusion is tilted, FIG. 5A schematically shows the solution of FIGS. 4 and 5 but with a misalignment error with axis not parallel of the zone of the elongated protrusion, that can occur inside the joined delivery ducts of the state of the art.
Figure 4A:
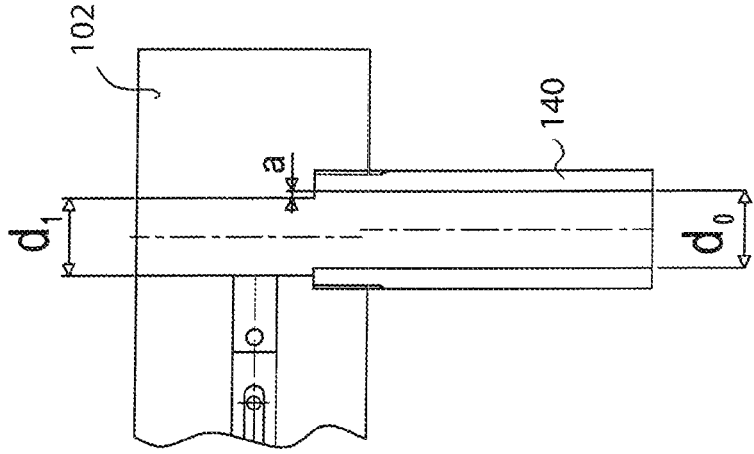
Figure 5A:
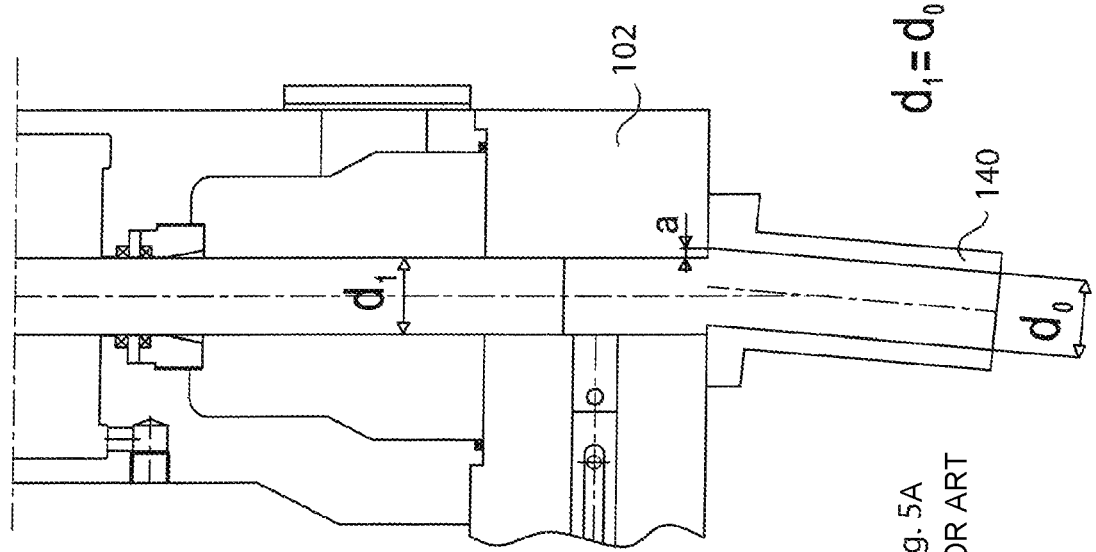

Referring to the enclosed FIGS. 6 to 45, an "L-shaped" high-pressure mixing device 1 according to the invention is disclosed, configured to mutually mix two or more liquid components or reactive resins to form a reacting polymeric mixture intended to be poured or injected to produce various objects. Polyurethane, vinyl ester, silicon and phenolic resins can be processed.

The mixing device 1 comprises a head-body 2 configured with a mixing chamber 3 having an inner cylindrical surface 4 provided with inlet openings or holes 5 and recirculation outlet openings or holes 6 for respectively inletting and recirculating liquid components or reactive resins; on the inlet openings 5 there are injectors that generate the jets of the two or more reactive resins transforming the pressure energy into kinetic energy of the jets.

Injectors can be placed opposite to one other or with various angles that converge in a single point of the jets.

Injectors are composed of a nozzle and can comprise a partialization pin with settable position to generate suitable throttles of the fluid vein that generate pressure upstream of the injector originating high kinetic energy jets.

Inside the mixing chamber 3 it is housed a valve member 9, slidingly movable along the longitudinal axis of the chamber 3, and provided with recirculation longitudinal slots 10. The valve member 9 is slidingly movable in the mixing chamber 3 between a backward position, in which it clears the inlet openings 5 and the component jets, and an advanced position, in which each of the aforesaid recirculation longitudinal slots puts in communication a respective inlet openings 5 and component jets through a respective outlet and recirculation opening 6 for recirculating the respective reactive component towards the specific storage tank.

The mixing device 1 comprises a tubular element for forming a delivery duct 7, arranged transversally with respect to the mixing chamber 3, along which the reacting mixture flows once outflowed from the mixing chamber 3, to be for example ejected to a forming mould. In particular, the delivery duct 7 extends orthogonally with respect to the longitudinal extension of the mixing chamber 3.

The delivery duct is composed of a single tubular element 7, made in a single piece, having an open outlet end E1 and an opposite open end E2, at a spacer-chamber 18' disclosed hereinafter. As better described in the following, the tubular element 7 is removably inserted in the head-body 2 with a certain clearance; in other words, a suitable gap I, which will be better specified later, is defined between the tubular element 7 and the head-body 2.

The tubular element 7, having metal-tube axial symmetrical shape, is configured with an intermediate transversal hole 13 which, in an assembled configuration, is aligned apart from tolerance deviations, to the mixing chamber 3 and contributes to its extension by a quantity equal to the thickness of the tubular element 7 itself, therefore until the delivery chamber defined in the latter. The transversal hole 13, which will be described more in detail in the following, is for putting the mixing chamber 3 in fluid communication with the delivery chamber which is defined inside the delivery duct 7.

The delivery duct 7 internally has section with an area greater than that of the mixing chamber 3 and extends such as to protrude at the bottom with respect to the head-body 2 and extends longitudinally between the axis of the mixing chamber and the outlet section E1 equal to or higher than at least three-fold the diameter of the delivery chamber itself. This characteristic is for reducing the mixing turbulence and is such that the flow of resin delivered can also be laminar or cohesive. In particular it is useful that the delivery duct has a length extension at least four times as much higher than its diameter starting from the upper end of the mixing chamber.

The delivery duct 7 has a cylindrical inner surface 8 in fluid communication with the mixing chamber 3.

Thanks to the configuration in a single piece of the tubular element 7, as there are no junction zones, it is avoided the onset of any type of step or error of parallelism of the axes of the duct thereby preventing the uneven accumulation of resin in the delivery duct.

Thanks to the configuration in a single piece of the tubular element 7, thus constituting the delivery duct, high levels of precision of geometrical shape are obtained; in other words, with such a configuration, the entire delivery duct 7 is perfectly cylindrical, i.e. it is easier to avoid errors of shape while producing it. This also allows to couple it with greater precision with the cleaning or self-cleaning member hereinafter described.

It is provided a cleaning member or stem 11 (self-cleaning stem) slidingly reciprocable inside such tubular element 7. The cleaning member or stem 11 has the function of ejecting, at the end of the delivery, the amount of mixture still contained in the tubular element 7 and to scrape away from the surface of the latter the adhered resin.

The delivery chamber and the relative self-cleaning stem have cylindrical shape and are mechanically coupled with a suitable precise and specific clearance that can vary from 8 to 60 millimetres according to the dimension of the delivery section.

Scraping the resin away from the surfaces is obtained by means of the sliding of the self-cleaning stem 11 which can have a scraping length, i.e. the cylindrical part that couples with a precise clearance with the inner diameter of the delivery chamber, reduced in length with respect to the extension of the chamber itself and which can have cavities or grooves or incisions of different shapes obtained on the surface that allow to seal, by means of sealing rings and/or by the accumulation of reacted resin, the cylindrical section itself with respect to the delivery chamber and concurrently reduce the surface on which there is the action of the bonding force and surface friction that the resin, reacted or being reacted, operates between the self-cleaning stem 11 and the delivery chamber, internal to the delivery duct 7.

In the head-body 2, as well as in the delivery tubular element 7, in a position diametrically opposed and in front of the mixing chamber 3 (and of the transversal hole 13 of the tubular element 7 itself) an additional pass-through hole 52 is obtained which can be kept occupied and sealed by means of a cap 50 during the normal operation.

The hole 52, having a service function, allows, once the cap 50 is removed, to apply to the head body an additional valve element for inletting washing or inerting liquids or gases. It is thus possible to wash for example a possible extension flexible duct of the delivery duct or it is possible to inject an inerting gas into the mould cavity in which the reactive resin is injected.

The cap 50 is centered and guided into the hole of the head body 2, and housed with increased clearance in the hole obtained in the tubular element 7 with a clearance similar to that adopted for the hole of the slide valve. In other words, a gap 111 is defined between the surface of the cap 50 and the second hole 52 (allowing for an easier and more rapid centering and coupling between cap 50 and hole 52) in which suitable elastic or elasto-plastic sealings 51 are interposed (adapted to avoid any leakages of fluid). Alternatively, in a similar way, it is possible to configure the cap 50 with a reduction of diameter at the zone intended to penetrate in the thickness of the tubular element 7, as it can be better seen in FIG. 11.

To better operate, the cleaning member 11 can be constantly lubricated by means of a lubricant liquid that can be stationary or that can be forcedly flowed (by means of a pump), in the spacer-chamber 18' which is defined above the delivery duct 7 (between the hydraulic control of the self-cleaning stem and the head-body 2) and also between the delivery duct 7 itself and the stem portion with reduced diameter of the cleaning member 11, as it can be better seen in FIGS. 10, 10A, 11, 15, 16.

The spacer chamber 18' serves for collecting chips of reacted resin that the cleaning member 11 scrapes during its sliding and transports into the chamber 18' during the opening movement towards it. The forced lubrication, when applied, removes said chips and further enters lubricant into the delivery duct 7, thus reducing friction, delaying the reaction of the thin layer of resin and thus facilitating its operation for millions of cycles.

Such lubrication, when applied, also has the effect of inhibiting the reacted resin in the coupling zones between the tubular element 7 and the head-body and in the transversal hole 13 that extends the mixing chamber 3, thus possibly promoting undesired leakages of lubricant during the first steps of use of the mixing device 1 (when a strong sealing action is not yet in place by the resin reacted in the various gaps). However, thanks to the specific sealing configurations and arrangements according to the invention described in the following, such risk of leakage of lubricant that would contaminate the reactive resins is successfully avoided. Precisely, any leakage of lubricant is efficiently avoided both in the interface between the delivery duct 7 and the head-body 2, and through the transversal hole 13 which constitutes an extension of the mixing chamber 3.

The following description mainly focuses on the tubular element 7.

The tubular element 7 can be removably inserted into a hole 12, obtained passing through the head-body 2, and extending transversally with respect to the mixing chamber 3.

The tubular element 7, once inserted, extends longitudinally throughout the hole 12 and transversally with respect to the mixing chamber 3.

Having the delivery duct in a single piece and separate from the head-body 2, such as the tubular element 7, enables to process and refine with the necessary precision the self-cleaning stem (cleaning member 11) and the delivery duct itself regardless of the head-body 2, with the possibility to mutually couple them with the desired clearance and with the geometrical precisions originating from revolution processing (i.e. processing on tool machines that rotate the component to be treated), giving the possibility to make them interchangeable for extraordinary maintenance of the parts when they are worn.

Different versions of structural configuration of the tubular element 7 are possible.

In particular, the tubular element 7 is configured with an annular shoulder zone 14 or portion arranged at a zone distant from the transversal hole 13, for example arranged towards the delivery direction (at the bottom) or towards the spacer chamber 18' (at the top) of the head-body 2.

Different modes for removably fixing the tubular element 7 are also provided. In particular, fixing elements (15; 15'; 16) will be described in the following that are configured for fixing rigidly though removably the annular shoulder zone 14 to a higher or lower surface of the head-body 2 to firmly secure the tubular element 7 in the transversal pass-through hole 12.

A tolerance with reduced clearance I is defined between the tubular element 7 and the transversal pass-through hole of the head-body 2. Such tolerance is provided to ease the insertion into, and the removal of the tubular element 7 from such transversal pass-through hole 12.

The gap has a clearance that can vary from 12 to 80 micrometres according to the different diameters that depend on the head sizes concerned.

The device 1 is further provided with sealing gasket elements 20 on the pass-through hole 12 transversal to the head body, positioned in circumferential cavities above and under holes 13 and 52 transversal to the delivery duct; sealing gasket elements 20 are configured to avoid the leakage of the polymeric mixture from the aforesaid gap towards the external side and towards the spacer chamber 18' and to avoid the leakage of the lubricant liquid towards the mixing chamber 3 through the clearance I of the above described gap.

Gasket elements 20 comprise in particular annular sealing elements 20.

Annular sealing elements 20 are housed in respective annular seats obtained on the surface of the tubular element 7 and/or on the cylindrical surface of the aforesaid longitudinal pass-through hole 12 and are placed near the transversal hole 13 that extends the mixing chamber 3 up until the delivery duct 7.

Annular sealing elements 20 can be provided directly above the intermediate hole 13 i.e. at a height interposed between the upper end E2 and the mixing chamber 3 and/or directly under the intermediate hole 13, i.e. at a height interposed between the lower end E1 and the mixing chamber 3.

Various possible versions of the high-pressure mixing device 1 will be described hereinafter, focusing the attention on the conformation of the tubular element 7 and its fixing configuration removable with respect to the head-body 2.

Figure 6:
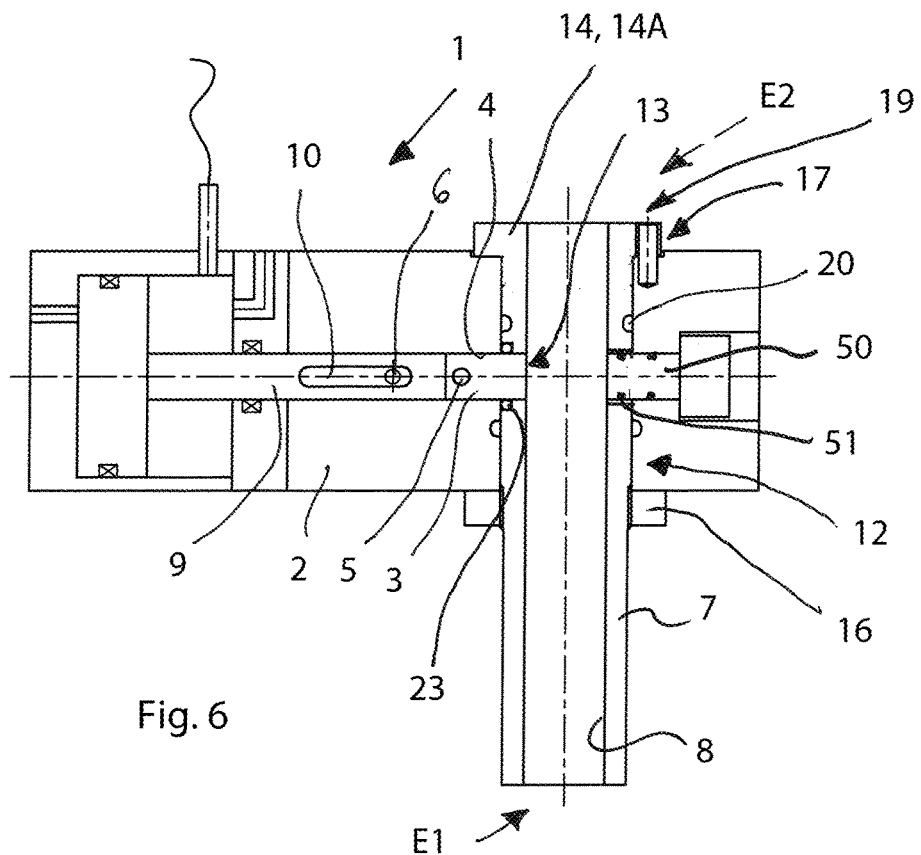
FIGS. 6, 7, 8, 9 show different configurations of delivery duct in the mixing device according to the invention.

According to the version shown in FIG. 6, the shoulder zone 14A, being annular or flange shaped, is arranged at the upper end E2 of the tubular element 7 and extends radially so that it can lay on the upper side surface of the head-body 2, in particular on a seat 17.

The seat 17, which can be obtained by counter bore, can be as deep as to house completely the shoulder zone 14A, or so as to receive only a part thereof, the remaining part of the shoulder zone 14 remaining cantilevered upwards to be encompassed by an additional component (spacer).

In the version of FIG. 6, the fixing elements comprise a threaded annular element 16 configured to engage with a threaded surface obtained on a zone of the tubular element 7 at a position opposite to the shoulder zone 14A, with respect to the head-body 2, and arranged to lay with pressure on a lower surface of the head-body 2.

By screwing the annular element 16, the tubular element 7 is pulled and blocked downwards making sure that the shoulder portion or zone 14A abuts against the lower opposite surface of the base-body 2.

To ensure the correct angular position of the tubular element 7 in the pass-through hole 12, radial and angular centering elements 19 are provided. These centering elements can comprise a cavity 19 obtained in the shoulder portion or zone 14 and in the seat 17 arranged to receive the latter or two or more radial notches, also present both on the tubular element 7 and on the head-body 2, into which pins or mutual centering keys or another equivalent mechanical abutment is inserted; such elements ensure the mutual correct positioning except for processing tolerances occurring both angularly and transversally to the longitudinal axis of the hole 12 itself.

For such coupling it is necessary that the distance of the axis of the intermediate hole 13, obtained transversally to the tubular element 7, measured in the longitudinal direction from the contact surface with the head body of the annular shoulder 14 of the tubular element 7 (delivery duct) is sufficiently precise but such as not to require special equipment other than that of mechanical processing made with modern tool machines.

Similarly, the precision of the notch radial positioning or radial centering notches must not require the use of special equipment other than that of mechanical processing made with modern tool machines, thus significantly facilitating assembly operations and possible replacement.

Figure 7:
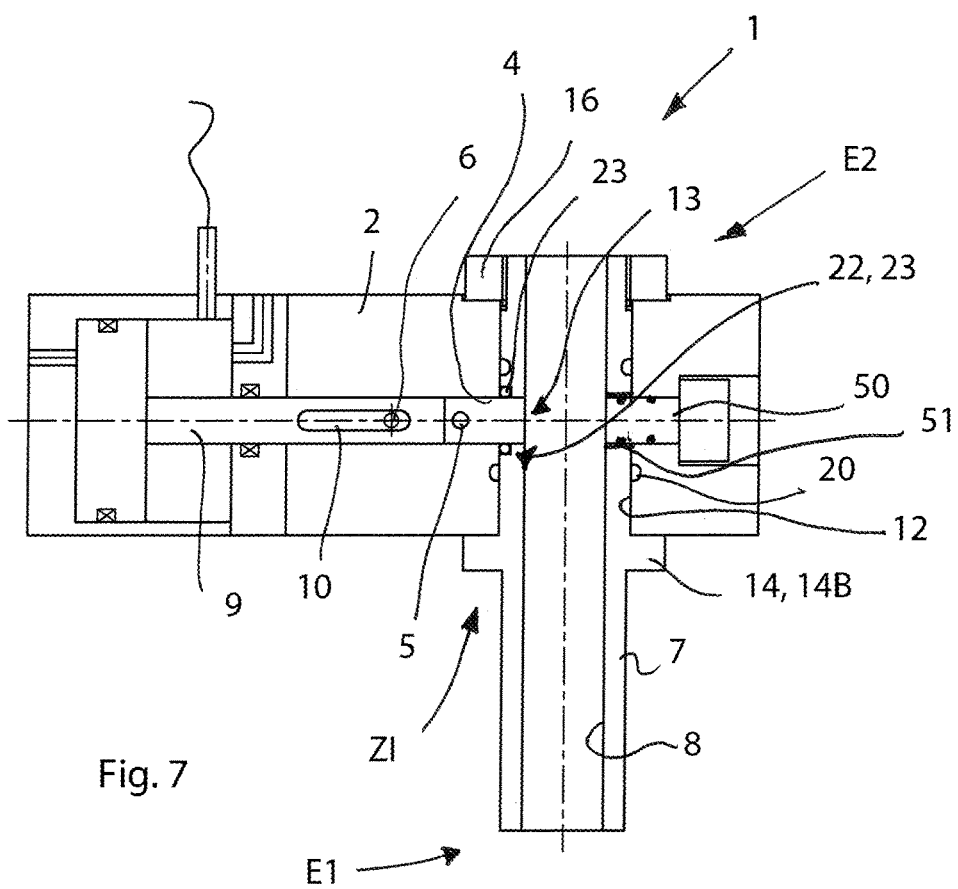

The version of FIG. 7 differs from the one just described in that the shoulder zone 14 and the annular element 16 have reversed positions In this case, the shoulder zone 14B extends, with an annular or flange shape, radially from an intermediate zone Z1 of the tubular element 7 and it is configured to lay on the lower surface of the head-body 2 at an opposite position with respect to the upper end E2 of the tubular element 7. By contrast the annular element 16 can be screwed on a threaded zone at the upper end E2 of the tubular element 7.

Figure 8:
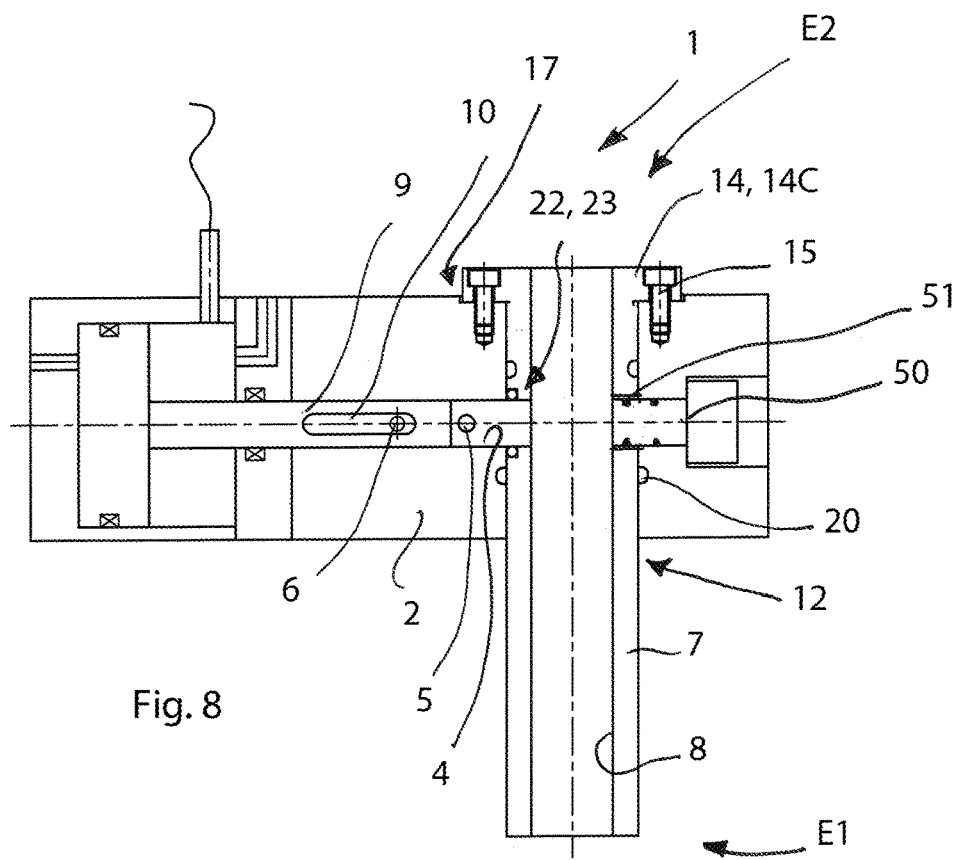

In the version of FIG. 8, the shoulder zone 14C extends from the upper end E2 of the tubular element. The annular fixing element 16 is not present and locking elements comprise specific screws 15 that are for tightening the shoulder zone 14C directly in the seat 17 obtained on the head-body.

Figure 9:
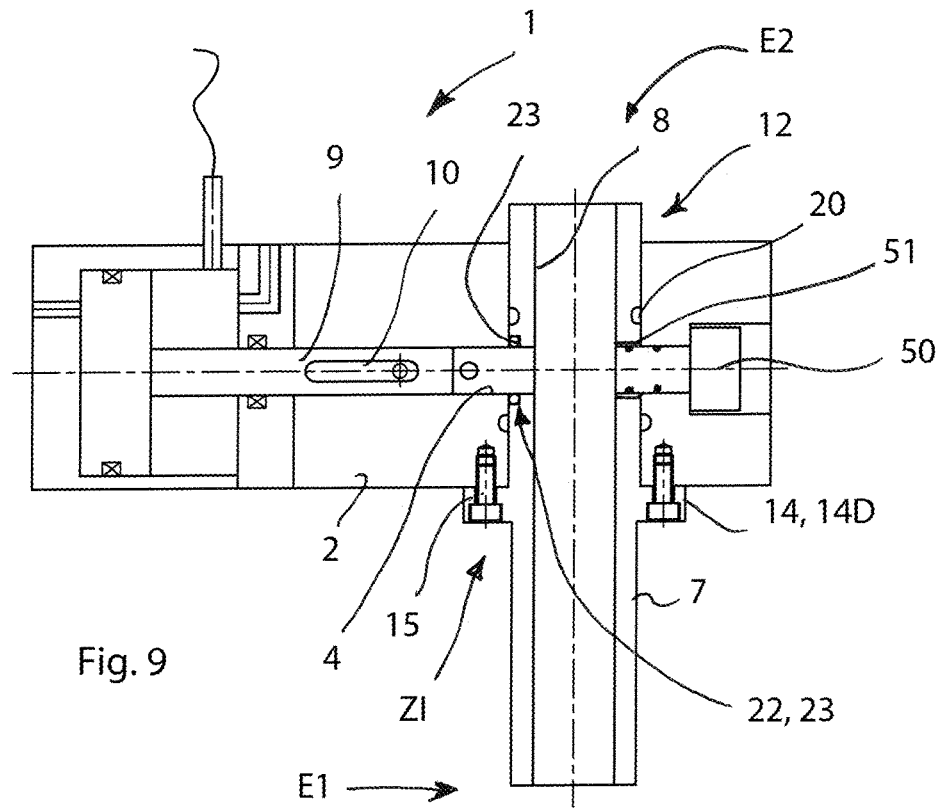

The version of FIG. 9 is similar to that of FIG. 8, but it differs in that it provides a shoulder zone 14D with locking screws 15 at the lower surface of the head body 2 in the aforementioned intermediate zone Z1.

In the versions as per FIGS. 7, 8, 9, though not shown, radial and angular centering elements are provided (e.g. centering pins and key slots) similarly to what described and shown referring to the version of FIG. 6.

Figure 10:
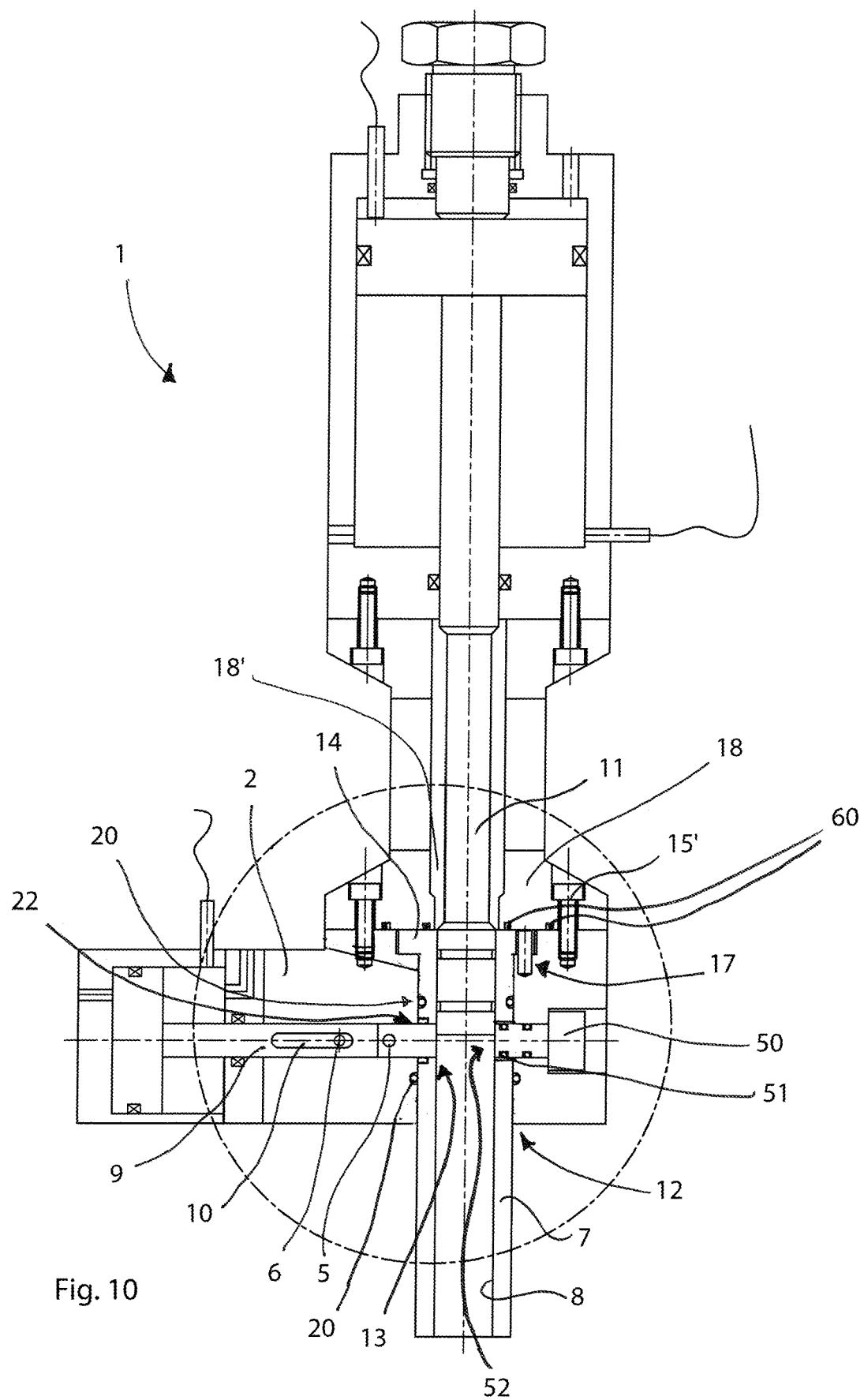
FIGS. 10 and 10A are longitudinal section views of one version of mixing device according to the invention, having a cleaning member in two respectively different positions.
Figure 10A:
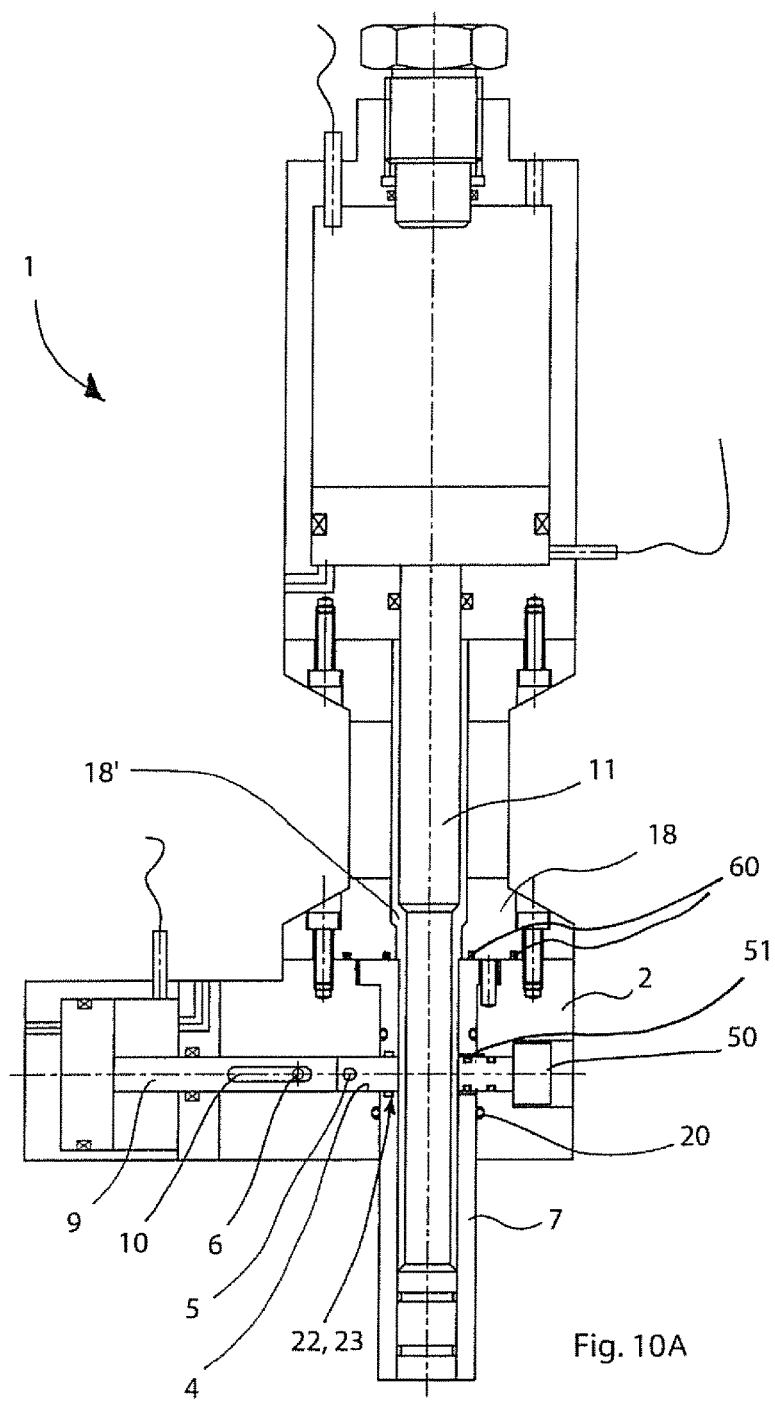
Figure 11:
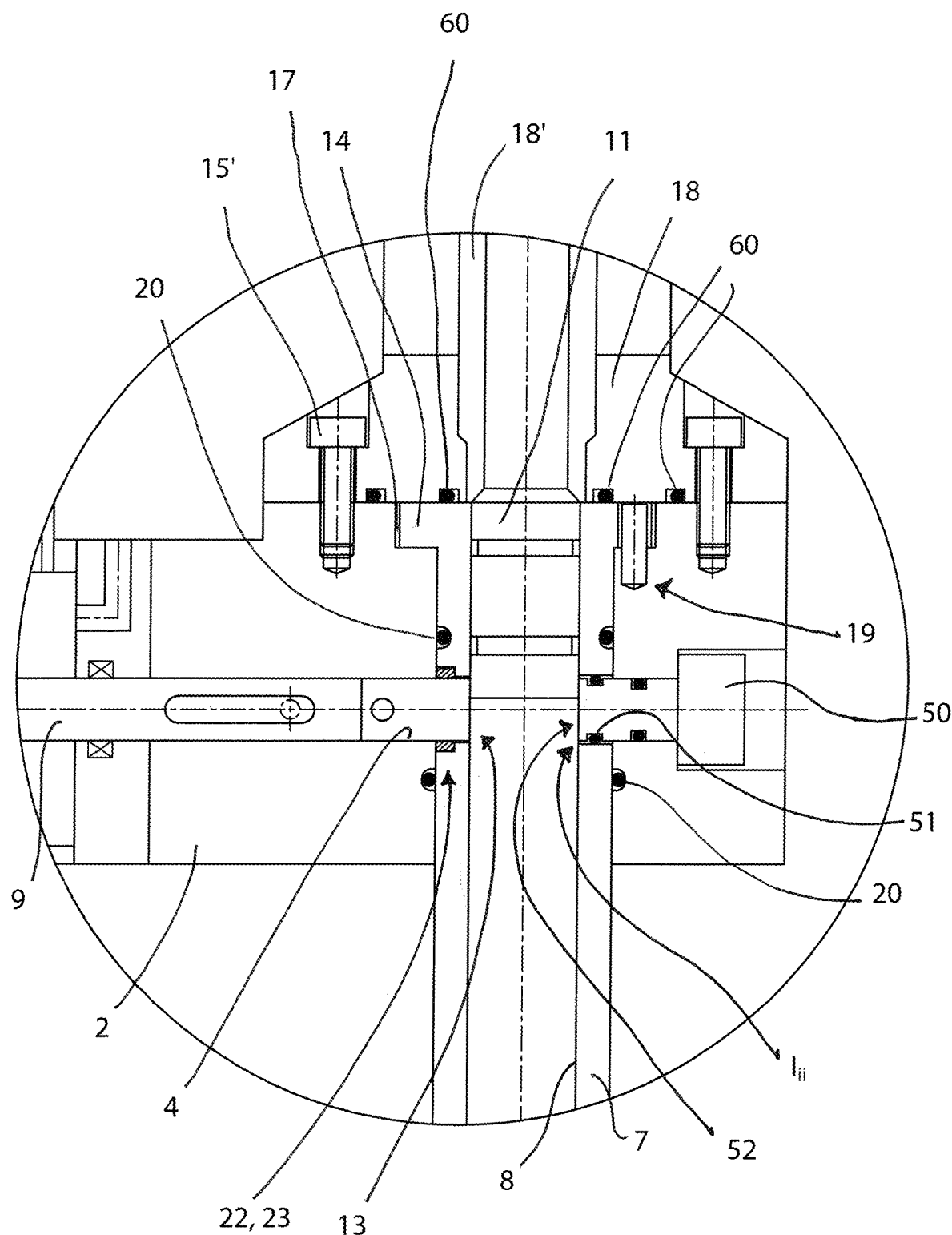
FIG. 11 is an enlarged detail of FIG. 10.

FIG. 10 (and the enlargement view of FIG. 11) shows another possible version according to the invention. The shoulder zone 14 is housed in the seat 17 and protrudes therefrom for a few hundredths of millimetre. More precisely, the upper surface of the bushing protrudes upward with respect to the head body 2 by an amount ranging from 3 to 9 hundredths of mm according to the size of the delivery tubular element 7.

Therefore, it is tightened with pressure between the head body 2 and a spacer element 18, which forms the aforementioned spacer chamber 18' and which is also fixed to the control cylinder of the cleaning member or stem 11. In this case locking elements comprise screw elements 15' arranged to fix the aforesaid spacer element 18, and hence the spacer chamber 18', to the head body 2. The upper surface of the shoulder zone 14 slightly protrudes from the surface of the head body 2 surrounding it and receives a tightening pressure by the elastically deformed spacer element 18.

In another possible version, as already mentioned, the shoulder zone 14 is received in a seat 17 partially obtained on the head-body 2 and partially in the lower surface of the spacer element 18 (spacer chamber 18'), or almost totally obtained in the lower part of the latter.

The interface zone between the mixing chamber 3 and the tubular element 7 will now be described more in detail, considering that the characteristics hereinafter set forth must be present in all the above described versions.

The intermediate transversal hole 13 obtained on the tubular element 7 that extends the mixing chamber 3 has a diameter D1 greater than a second diameter D2 of the mixing chamber 3.

Thanks to this constructive configuration, it is made sure that the diameter D1 of the hole 13 transversal to the delivery duct 7 is sufficiently increased compared to diameter D2 of the mixing chamber so as not to form protruding steps within the diameter D2 even when there are radial and longitudinal misalignments deriving from processing and coupling tolerances of the tubular element 7 with the head-body 2.

It is possible to compensate, while assembling, possible alignment mistakes deriving from processing and mutual positioning tolerances between the hole 13 of the tubular element 7 and the hole of the mixing chamber 3 avoiding the creation, while locking the tubular element 7, of inner protrusions inside the end section of the mixing chamber 3 in the head body 2. Such a configuration makes it possible to avoid the creation of protruding steps in the mixing chamber and of interfering zones that would frontally and laterally hinder the movement of the valve member 9 when it must be taken to the totally advanced closure position.

As generally the valve member 9 is coupled in the mixing chamber 3 with a very reduced clearance (from about 5 to about 25 thousandths of millimetre), the greater diameter D1 of the transversal hole 13 makes it easy to couple the latter with respect to the outlet section of the mixing chamber 3, despite possible errors of mutual positioning deriving from tolerances and processing involved in the mutual coupling of pieces.

The transversal hole 13 is thus configured as an extension of the mixing chamber 3 and can internally receive the front end part of said valve member 9 in the advanced position.

The difference $I_i$ between the first diameter D1 and the second diameter D2 has a value between about 0.04 mm and about 0.3 mm. This difference of diameter thus facilitates assembly operations and avoids interferences in the discontinuity zone of the surfaces that might cause rubbing, scraping and seizure of the valve member or slide valve 9 or damage the sealing between surfaces and lead to leakages of resin or lubricants, such scaling being efficiently ensured—also compensating for misalignments and differences in diameter—by the particular sealing system set forth hereinafter.

Similarly, the diameter of the hole 52 is greater than the diameter of the cap 50 by an amount from 0.1 to 0.3 mm to avoid interferences of the cap with the inner diameter of said hole. The respective deriving gap 111 has a thickness or clearance up to 0.3 mm.

In the tubular element 7 an annular seat 22 is also obtained that is arranged coaxially to the aforesaid intermediate transversal hole 13 and configured to house an elastic or elasto-plastic sealing element 23 which is assembled with pressure and which is adapted to elastically interact, with interference with its seat and with the valve member 9 to perform an efficient sealing action and one further configuration to perform an hydraulic sealing action towards the surface of the hole 12 housing the tubular element 7.

This sealing system represents the most efficient alternative to the solution providing small circular cavities on the cylindrical front part of the slide valve 9 and inserting therein a protruding resin-sealing which can however easily crack or wear on the corners of the aforesaid discontinuity surface and on the corners of the inlet holes of reactive resins.

It also represents an alternative to resin-sealing by applying hardening resin or resin-sealing circular cavities obtained on the extension hole 13 of the mixing chamber 3 in the self-cleaning bushing delivery duct, resin-sealing which is made less stable due to the presence of lubricant in the delivery duct itself.

With respect to these solutions, it is much simpler and more convenient to obtain, in accordance with the invention, the annular seat 22 on the extension hole 13 of the mixing chamber in the tubular element 7, housing therein the sealing element 23 made of elastomeric or elasto-plastic material.

The annular seat 22 and the elastic or elasto-plastic sealing element 23 can have different configurations.

According to an embodiment, the annular seat 22 can be obtained inside the thickness of the tubular element 7; in this case the annular seat 22 extends circularly with an even transversal section, i.e. having a toroidal shape and it contains laterally on both sides the elastic or elasto-plastic sealing element 23. An example of this configuration is shown in FIGS. 12, 12A, 12B, 12C, 13, 14, 15.

In other possible versions, the annular seat 22 can be obtained by a counter bore on the external surface of the tubular element 7 and extends in the thickness of said tubular element 7 with an external saddle shape so as to be open on a side and be faced both on the surface delimiting the transversal hole 13 obtained in the tubular element 7, and be faced on the surface of the pass-through hole 12 of the body-head 2, (extending transversally to the mixing chamber), at the end section of the mixing chamber 3, as it is better shown in FIGS. 16 and 29 to 33.

A version of a sealing ring 23 is visible diagrammatically in FIG. 12B.

Figure 13:
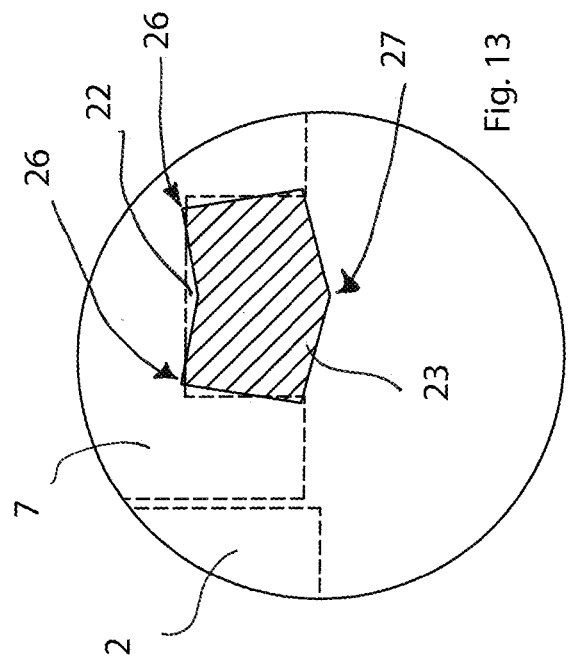
FIGS. 13 and 14 show the behaviour of the sealing element and in particular its shape variation, with respect to the seat housing it, from an undeformed state (FIG. 13) to a working condition (FIG. 14) in which the sealing element is inserted with interference in the aforesaid seat.
Figure 14:
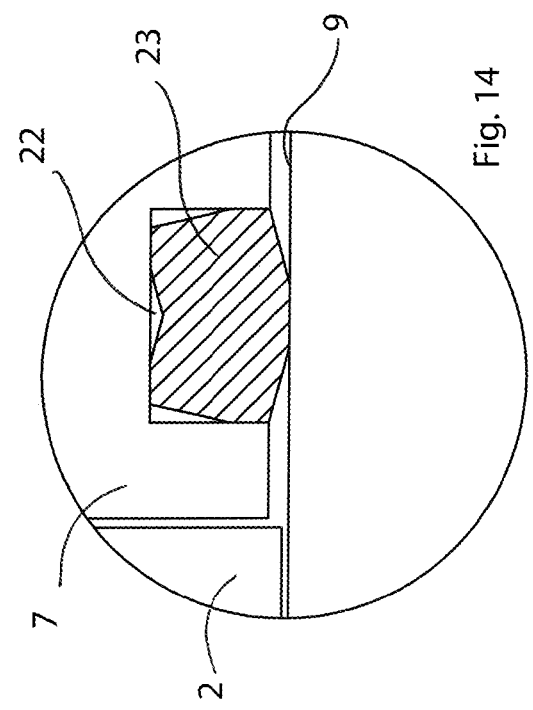

Such elastic or elasto-plastic sealing element 23 is thus inserted with interference and compressed inside the constant-section annular seat 22 that can be plane-shaped or saddle-shaped (annular seat 22C, as shown in FIGS. 42 to 45). FIGS. 13 and 14 show the two different conditions of the sealing element 23 and in particular the change of shape thereof, compared to the seat 22 housing it, from an unshaped state (FIG. 13) to a working condition wherein the sealing element is inserted with interference and is compressed in the aforesaid seat 22 (FIG. 14).

The sealing element 23 shown in FIG. 12B has a section characterized by only one cusp 27 addressed inwardly (towards the revolution axis) of the toroidal scaling and by two cusp zones 26 on the greater diameter external to the toroid with an intermediate recess zone in between the two cusps and two side tilted surfaces diverging inwardly of the toroid that form protruding corners. The sealing element, once inserted at forced contact with the annular seat surfaces 22, has cusps and corners pressed and squeezed against the surfaces of the annular seat 22 exerting by deformation a pressure ensuring the sealing action. The cusp 27 on the most internal diameter is intended to interact by squeezing while passing, with the cylindrical surface of the valve member 9 (slide valve). Cusp zones are defined by the intersection of surfaces having different lying positions, in particular surfaces having conicities opposite between them.

A similar conformation can be found in the sealing element 23A shown in FIG. 19 which has a similar toroidal extension.

In particular, surfaces intended to interact with the valve member 9 have a tilted lying position such as to serve as a pilot hole for the valve member 9 itself.

Figure 18:
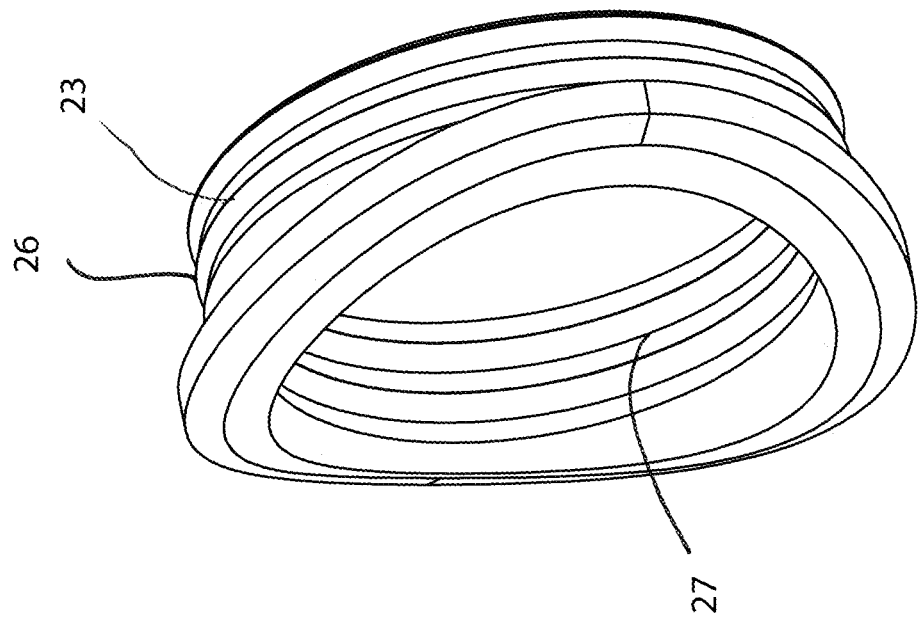
FIGS. 17 and 18 are two perspective views of one version of sealing element having a saddle shape according to the invention.
Figure 17:
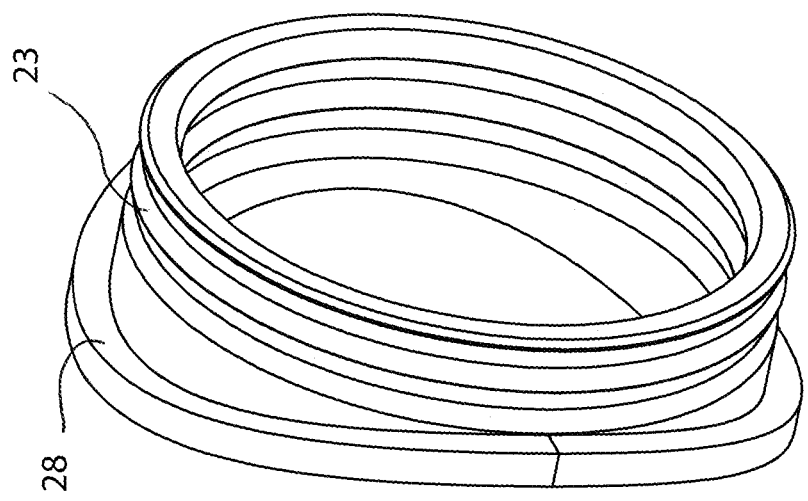
Figures 38, 39:
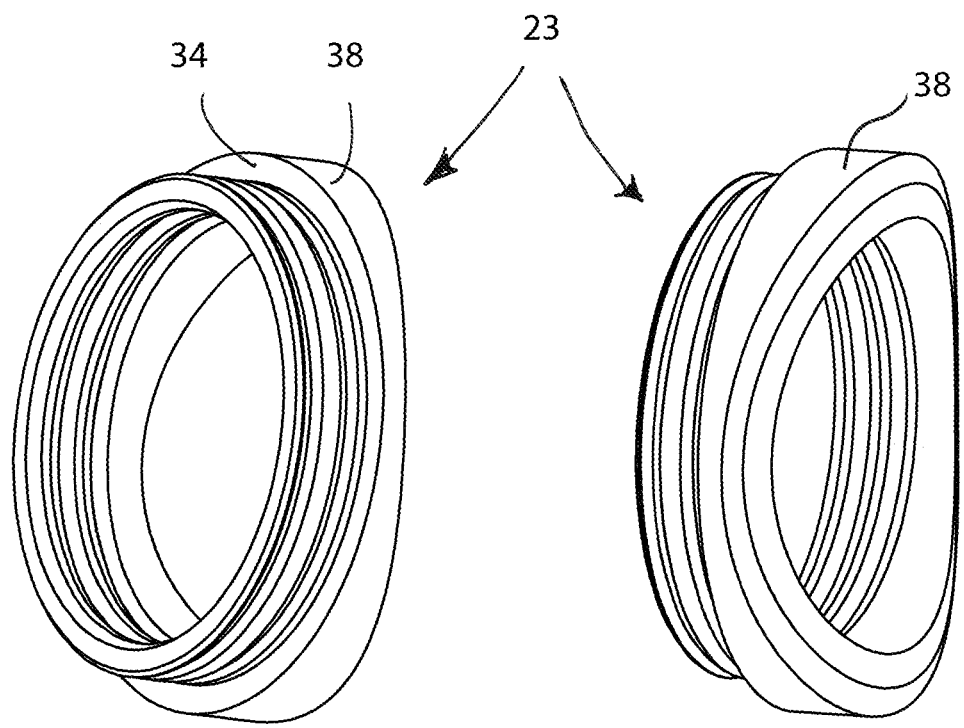
FIGS. 38 to 41 are several views of the sealing element intended to be housed in the sealing seat shown in the FIGS. 34 to 37.
Figures 40, 41:
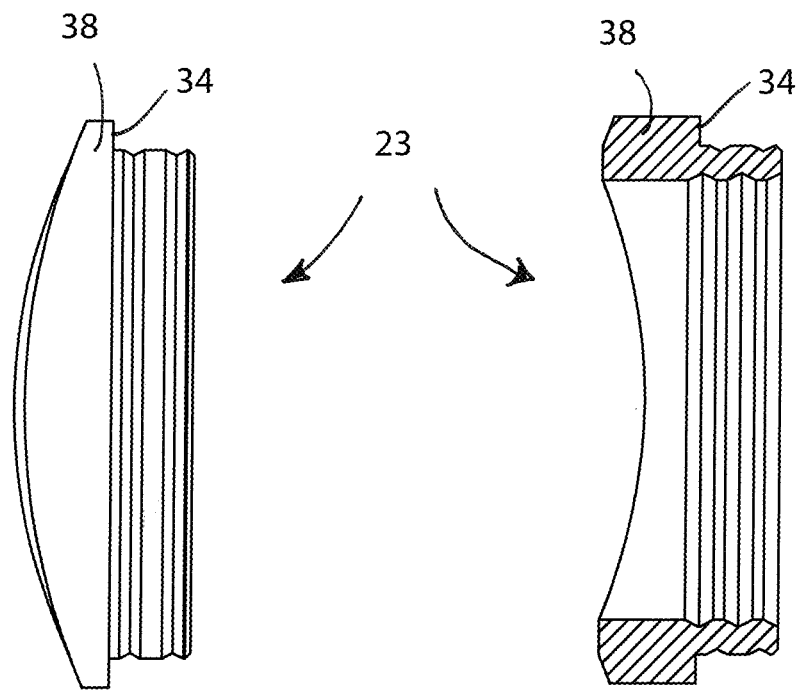

FIGS. 17, 18 are perspective views of the sealing element 23 in one of the possible "saddle" shaped configurations. Other views (in section) of the saddle-shaped sealing element are reported in FIGS. 21 to 23 and 25 to 28.

Cusp zones 26 have the effect of increasing the coupling action with the annular seat 22 compensating for possible dimension irregularities or surface ridges.

When the sealing element is forced into its seat, cusps 26 are compressed against the surfaces they couple with and they have the effect of increasing the specific pressure necessary for sealing the coupling surface with the annular seat, adapting to possible dimensional irregularities or surface ridges. The sealing element 23B (FIG. 20) has a section with two bevelled-cusp protrusions 26A and an intermediate zone with a recess on the outer surface with greater diameter and a section with a recess between two cusps on the inner surface and corners tilted on the side surfaces in general, sealing elements 23C (FIG. 21) 23F (FIG. 24), 23G (FIG.

23), comprise one or more bevelled-cusp zones on the outer and/or inner surfaces. Elements 23A, 23B. 23E, 23L have sharp-corner cusps.

Elements 23C (FIG. 21), 23D (FIG. 22), 23E (FIG. 23) 23G (FIG. 25), have a plane side that is orthogonal to the circular-extension axis with sharp corner and the opposite saddle-shaped side with sharp corner deriving from the intersection of two orthogonal cylinders with diameters corresponding to the mixing chamber 3 and to the outer surface of the tubular element 7 and can be mounted in open cavity.

Elements 23H (FIG. 26), 23I (FIG. 27), 23L (FIG. 28) are configured with an annular saddle-shaped protrusion or shoulder, a shape generated by the intersection of two orthogonal cylinders with diameters corresponding to the outer diameters of the protrusion whose seat 22A (better visible in FIGS. 29 to 33) is obtained at the outer part of the external thickness of the tubular element 7.

FIGS. 17 and 18 are perspective views of the sealing element 23 in one of the possible "saddle" geometrical configurations.

When the sealing element is forced into its seat, cusps 26 or bevelled cusps 26A are compresses against the surfaces they couple with by deformation and they have the effect of increasing the specific pressure necessary for the sealing on the coupling surface with the annular seat 22, adapting to possible dimension irregularities or surface roughness.

Figure 12C:
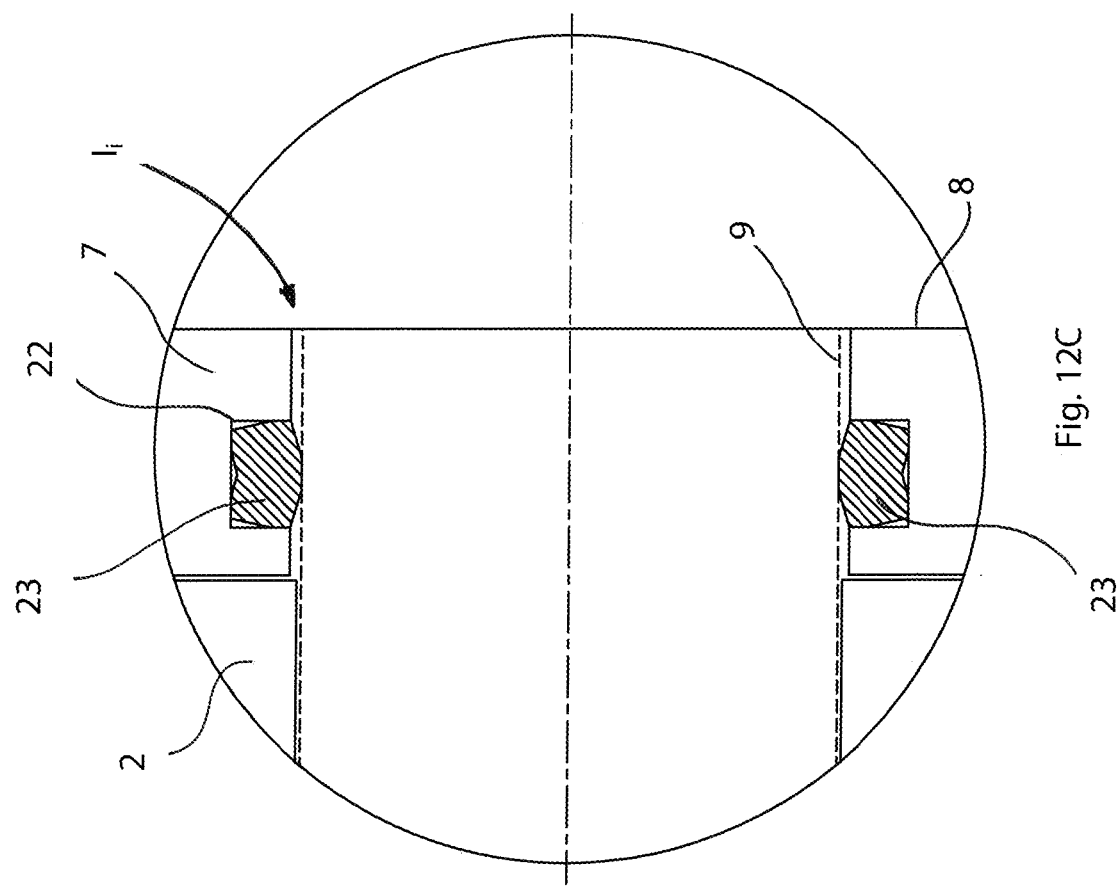
Figure 15:
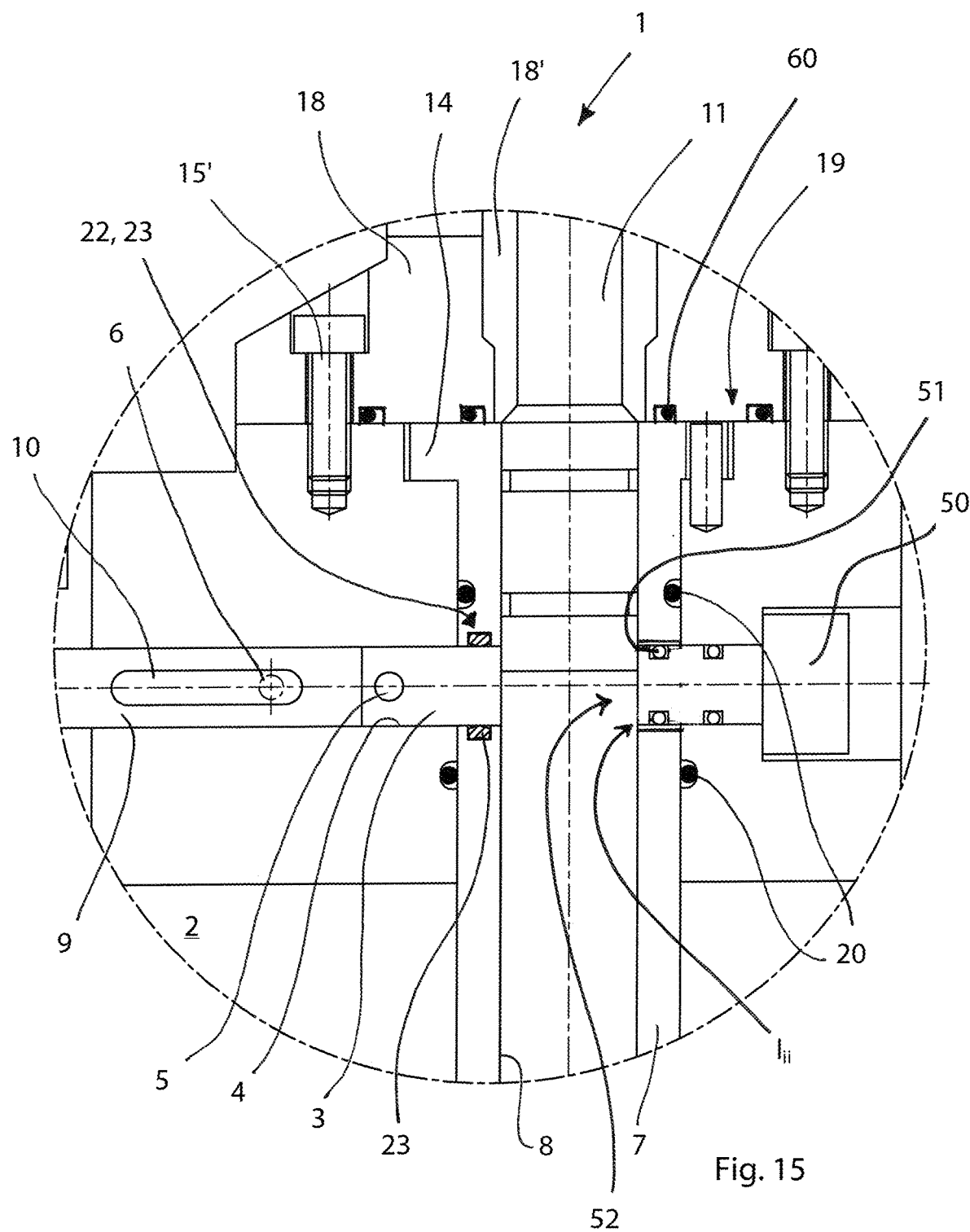
FIGS. 15 and 16 are schematic section partial views of the mixing device according to two possible versions of sealing element on the intermediate hole.
Figure 16:
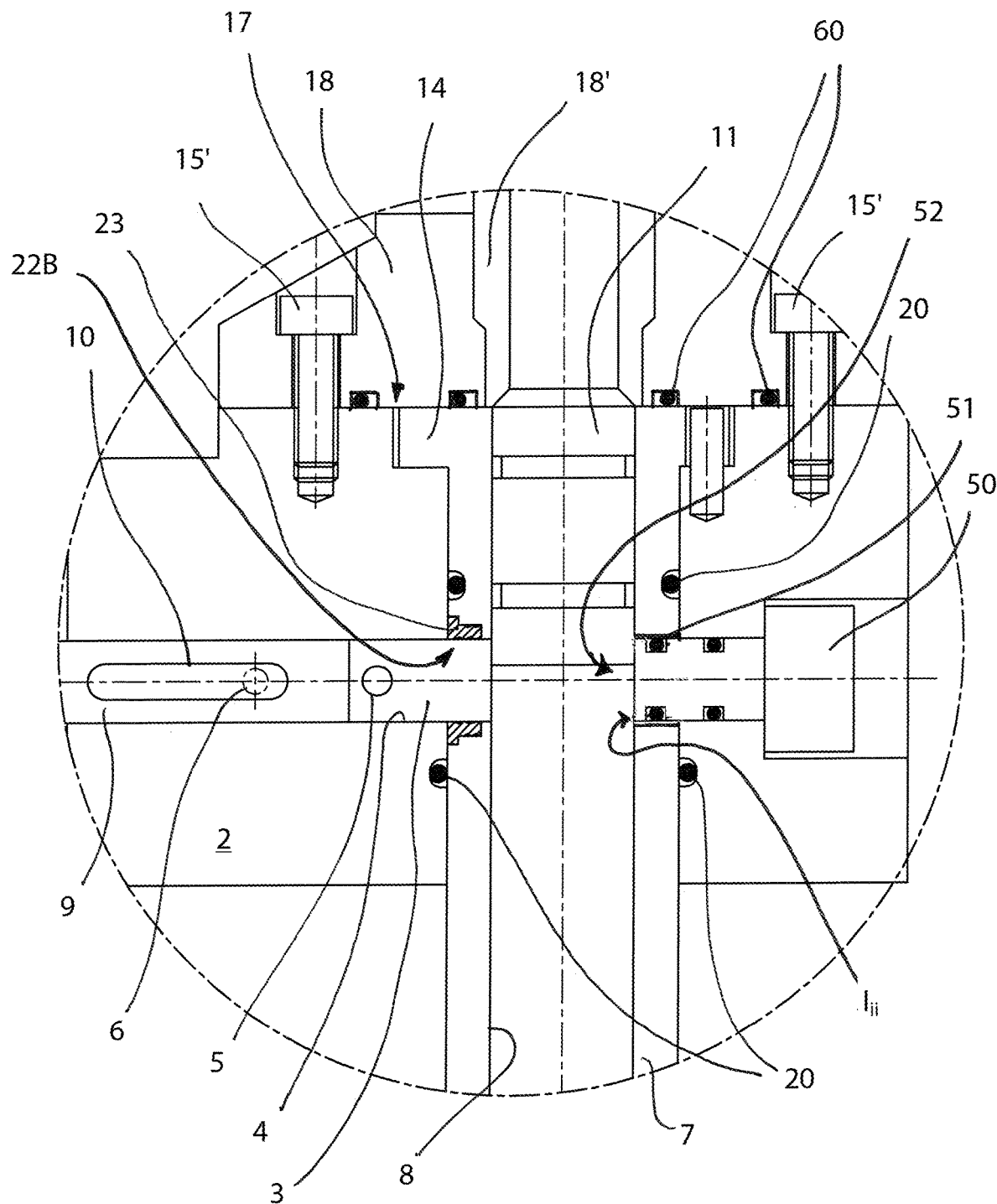

From the schematic FIG. 12B it is clear that the inner diameter D3 of the cusp zone 27 is smaller than the diameter D2 of the mixing chamber 3 and it is also smaller than the outer diameter of the valve element 9 and that surfaces of the outer and side corners and cusps of the sealing element are compressed and adapted to the surface they press against. Thereby, the sealing element 23 interacts, elastically, with the valve member 9 (as shown in FIGS. 12C and 14) and ensures the hydraulic sealing against leakages of the reactive components and of lubricant.

Therefore the cusp ones 27, which can have a bevelled cusp 26A, act to perform an efficient sealing action on the cylindrical surface of the valve member 9 when the latter is present or when it moves towards its advanced position.

Sealing elements 23H (FIG. 26), 23I (FIG. 27), 23L (FIG. 28) are configured with an annular peripheral relief 28 or "saddle-shaped" shoulder 28 extending radially according to the intersection of two orthogonal cylinders with the diameters corresponding to the outer diameters of the projection whose seat is obtained in the outer thickness of the tubular element.

The peripheral relief 28 ensures a more efficient hydraulic sealing in open cavity in the coupling zone between the external surface of the tubular element 7 and the transversal hole 12 of the head-body 2. Substantially, the peripheral relief 28 is compressed between the counter bore relief obtained in the thickness of the tubular element 7 around the hole and the surface of the gap I between the tubular element 7 and the transversal hole 12 of the head-body 2.

In FIGS. 34 to 37, it is shown a version of tubular delivery element 7, in whose intermediate hole 13 a seat 22B is obtained, for the sealing element 23, made according to another possible geometrical configuration. In this case, the seat 22B is intended to house a sealing element 23 configured as shown in FIGS. 38 to 41. Such sealing element 23 comprises a relief 38 which is saddle-shaped externally but which comprises, internally, a plane matching surface 34.

The seat 22B also has, externally, a saddle shape, while internally it is delimited by a plane-shaped shoulder surface 35, obtained by counter bore, adapted to abuttingly receive the plane matching surface 34 of the aforesaid sealing element 23.

The plane-shaped shoulder surface 35 of the seat 22B acts to compress the sealing element 23 against the surface delimiting the pass-through hole 12 of the head-body 2.

Such a configuration enables the element 23 to exert the hydraulic sealing both at the interface between the intermediate transversal hole 13 and slide valve 9, and at the interface between the external surface of the tubular element 7 and housing surface of the pass-through hole 12 (of the head-body 2)

In one version, shown in FIGS. 42 to 45, the annular seat 22C, obtained at the intermediate hole 13, is conformed for the constant-section and saddle-shaped sealing element entirely comprised in the thickness of tubular element 7.

The seat 22C configuration with constant section but having saddle shape, houses a respective sealing element 23 having even section.

Such seat 22 configuration can be implemented for example on double-interpolation numeric control machines.

In summary, the sealing element 23, in different versions, of elastic or elasto-plastic material, is provided with lip portions with sharp or bevelled corners which ensure sealing in the compressed state. The sealing action is in fact more reliable and efficient if carried out through a reduced annular extending surface duly compressed which thus operates with high specific pressures and which adapts, by deformation, to roughness and geometrical errors of the surface on which sealing must be carried out. As seen in FIGS. 17 to 28, the sealing element can have an outer surface with one or more cusp zones with sharp-corners or bevelled corners with triangle or trapezoidal profile, or an inner surface with a cusp zone with triangle or trapezoidal profile, or an outer surface with four cusp zones with triangle or trapezoidal profile.

Generally speaking, thanks to the specific configurations of the sealing ring 23 and seat 22 in the various above described versions, it is possible to manufacture the tubular element 7 (metal tube) without highly precise construction restraints which would force to manufacture it as mechanically coupled with the head-body 2; it is thus possible to manufacture the two pieces separately and simply couple them by means of the various removable fixing solutions previously described (flange shoulder zone, threaded ring, tightening by spacer 18, etcetera).

Thanks to all the above described hydraulic sealing elements, another technical advantage can be obtained. Previously, in the disclosure, reference was made to a forced lubrication by inletting lubricant liquid into the spacer chamber, in order to ensure the sliding of the cleaning member 11 in the tubular element 7. However, it was also stated that such lubrication inhibits the formation of reacted resin which contributes to the sealing action in the coupling zones between the tubular element and the head-body and in the hole 13 that extends the mixing chamber 3 towards the front cylindrical surface of the valve element or slide valve, consequently promoting or maintaining undesired leakages of lubricant when the mixing device 1 is first used. However, such a risk is successfully avoided thanks to all the above described sealing elements, that efficiently act both at the interface between the single-piece delivery duct 7 and head body 2 and at the interface between the transversal hole 13 of the duct 7 and the slide valve 9 in the recirculation advanced position.

From what disclosed and shown in the enclosed drawings, it is clear that the mixing device 1 according to the invention successfully achieves all the intended objects.

The solution according to the invention, in addition to significantly reducing the damaging events and thus to lengthening the operating life of the high-pressure mixing device 1, simplifies and makes it more cost-efficient to construct and assemble the device 1 itself and it also allows an easier, more rapid and cost-effective replacement of the delivery duct 7, also due to the coupling system between the tubular element 7 and pass-through hole 12 which provides the clearance gap I, and sealing elements 20.

The use of a single-piece tubular element 7, as the delivery duct, contributes to significantly lengthen the average operating life of the cleaning member 11 and delivery duct 7 itself, and an overall improvement of the operating conditions of the entire mixing device 1.

The dismantling and cleaning operation too of the spacer element 18 is eased.

Thanks to the greater diameter of the transversal hole 13 in the tubular element 7, together with the new sealing system provided by the aforesaid annular seat 22 and sealing element 23, it is also extremely simple and quick to axially center and angularly orient the delivery duct with respect to the seat of the head-body 2 housing it and with respect to the mixing chamber, easily compensating for the geometrical errors deriving from processing tolerances and possible geometrical and dimensional inaccuracies.

In brief, the delivery duct 7 made in a single piece, the clearance gap I with the head-body 2, sealing elements 20, 23, 51 and the diameter of the intermediate hole 13 greater than the diameter of the mixing chamber 3, of the hole 52 greater than the diameter of the cap 50, in mutual synergy, allow to immediately insert the delivery duct 7 into the pass-through longitudinal hole 12 of the head-body 2, in a position that is sufficiently longitudinally, transversally and also angularly aligned such as to avoid interferences with the front of the movable valve member, significantly removing laborious and time-consuming positioning operations and the subsequent processing needed to compensate for possible misalignments and steps protruding at the interface between assembled parts and also avoiding a long and delicate operation of application of hardening resin adapted to seal, while being coupled, existing clearances and gaps between the tubular element and the hole 12 and the mixing slide valve and the hole 13.

Thanks to the delivery duct 7 made in a single piece, and thanks to the sealing elements (20,23) that act both on the outer side surface of the duct 7 and on its transversal hole 13 (which is an extension of the mixing chamber 3), they are avoided the risks of leakage of mixture and lubricant liquid which can occur in the prior art devices and which must be sealed for example by applying hardening resins whose polymerisation and removal of excesses during the assembly and sealing inspection step take additional working hours. It is also known that the reacted resin polymerising in the delivery duct stratifies significantly and unevenly on the surface of the delivery duct, determining strong compression zones against the cleaning member at such stratification zones, with subsequent strong metal-on-metal friction on the opposite zones. Even if lubrication delays and reduces the extent of this phenomenon, it is however not able to interrupt it. As mentioned in the introduction, this uneven behaviour is more emphasised if the delivery duct is joined and has steps or geometry errors, tilted axis or diameter variations and hence meatuses variations and different accumulations caused by the step protrusions, as it occurs in the devices of the known art.

The configuration of the delivery duct 7 in a single piece (avoiding any kind of unevenness or steps that promote resin stagnation or accumulation and enabling to obtain a very precise geometry) with the specific arrangement of sealing elements (20, 23, 51) (made of elastic or elasto-plastic material for example elastomer or polytetrafluorethylene) act together to avoid the aforementioned phenomena and also to avoid possible leakage of lubricant liquid (as above described) typically more likely to occur in the first days of use of the mixing head.

Thanks to the configuration of the tubular element 7 in a single piece, it can also be coupled with the self-cleaning member with a greater precision It is possible to configure and dimension the device 1, and parts thereof, as desired, according to the applications it is intended for.

The materials, as long as they are compatible with the specific use they are intended for, can be properly selected according to the requested requirements and according to the available, state of the art.

Variations and/or additions to what above described and illustrated in the enclosed drawings are possible, without departing from the claimed scope of protection.

The invention claimed is:

1. A high-pressure mixing device suitable for forming a polymeric mixture resulting from a first and at least a second chemically reactive liquid component, said mixing device comprising:
   a head-body configured with a mixing chamber having an inner cylindrical surface provided with inlet openings and outlet openings respectively for injecting and recirculating the reactive components;
   a delivery duct for releasing and ejecting the resulting polymeric mixture, having an inner cylindrical surface in fluid communication with said mixing chamber and inside which a cleaning member is slidingly movable suitable for ejecting the mixture once a delivery is finished;
   a valve member provided with longitudinal slots for recirculating separately the reactive liquid components and slidingly movable in said mixing chamber between a backward position, in which it leaves said inlet openings exposed, and an advanced position, in which each of said longitudinal recirculating slots puts in communication one respective inlet opening with a respective outlet opening for recirculating the respective reactive component;
   wherein said delivery duct is composed of a tubular element made in a single ne non-jointed piece, having an open upper end communicating with a spacer chamber, and an open lower end for delivering the reactive mixture and,
   a cleaning member or stem reciprocable via hydraulic control in said tubular element between an upper backward position—in which the cleaning member or stem clears, at least partially, the outlet of said mixing chamber into a delivery chamber defined in said tubular element for enabling the outflow of the reacting mixture—and a lower advanced position in which the cleaning member or stem ejects the mixture still contained in said tubular element and scrapes away from the surface of said tubular element the adhered resin;
   said tubular element being a piece distinct from, separated and processed separately from, said head-body and removably insertable into a pass-through hole of said head-body, extending transversally with respect to said mixing chamber, said tubular element being arranged to extend transversally with respect to said mixing chamber and to protrude at the bottom from said head-body longitudinally along an axis of said pass-through hole;

wherein said tubular element is configured with an intermediate transversal hole placed, in an assembled configuration, so as to extend, with an increased diameter, said mixing chamber which thus extends up until it leads into an inner chamber of said tubular element;

said intermediate transversal hole having one first diameter greater than a second diameter of said mixing chamber to compensate for, while assembling, mutual geometrical positioning errors and tolerances due to processing tolerances such as to avoid steps and zones interfering with the movement of said valve member inside the intermediate transversal hole, said intermediate transversal hole being configured as an extension of said mixing chamber and conformed for internally receiving a front cylindrical end part of said valve member in said advanced position;

an elastic or elasto-plastic sealing elements;

on the surface that delimits said intermediate transversal hole an annular seat being obtained which is conformed for housing said elastic or elasto-plastic sealing element, said sealing element being housed with forced interference and compressed in said seat for exerting an hydraulic sealing function against leakages of reactive components from said longitudinal recirculating slots through said intermediate transversal hole and seats of said tubular element and against leakage of lubricant liquid from the gap defined between a stem of a control cylinder of said cleaning member and said tubular element—towards said longitudinal slots when the end front part of said valve member is in said advanced position;

said tubular element being configured with an annular shoulder zone placed at a zone distant from said intermediate transversal hole, and fixing and orienting elements being provided and configured for removably fixing said annular shoulder zone to a side surface of said head-body transversal with respect to said pass-through hole, for locking in the correct position said tubular element in said pass-through hole, between said tubular element and said pass-through hole and in said head-body being defined a clearance gap configured to allow to easily interchange f said tubular element, to ease the insertion into, and the removal of said tubular element from said pass-through hole, sealing and centering elements being also provided configured to avoid leakages of polymeric mixture of the reactive components outside said mixing chamber and through said clearance gap and towards said spacer chamber and to avoid any leakage of lubricant liquid from said spacer chamber towards said mixing chamber through said clearance gap.

2. The high-pressure mixing device according to claim 1, wherein said annular seat is arranged coaxially with respect to said intermediate transversal hole, said at least one elastic or elasto-plastic sealing element being protruding towards the inside of said intermediate transversal hole and compressed within its seat for interacting with interference with said valve member, said annular seat having constant section completely contained in the thickness of said tubular element, without protruding on the outer cylindrical wall of said tubular element and having such a plane toroidal shape as to laterally contain at both sides said sealing element forcedly housed, or said annular seat being saddle-shaped obtained through interpolation or being externally saddle-shaped and with annular or plane counter bore, coupled or not coaxially with a counter bore with reduced diameter, said annular seat being such that it is open on a side and facing the surface that delimits said pass-through hole.

3. The high-pressure mixing device according to claim 1, wherein said head-body and said delivery duct mutually extend according to an "L" configuration, wherein said delivery duct extends orthogonally with respect to the longitudinal extension of said mixing chamber and has a diameter section greater than that of the mixing chamber, and wherein said delivery duct extends such as to protrude with respect to said head-body and extends longitudinally, measured from the axis of the mixing chamber until the end outlet mouth of the reactive mixture, at least three times as much higher than its own diameter.

4. The high-pressure mixing device according to claim 1, wherein the difference between said first diameter and said second diameter has a variable value between about 0.04 mm and about 0.3 mm and wherein said clearance gap has a variable value from 12 to 80 micrometres according to the different diameters of the mixing chamber.

5. The high-pressure mixing device according to claim 1, wherein said annular shoulder zone extends radially at said upper end.

6. The high-pressure mixing device according to claim 5, wherein said shoulder zone, having annular or flange shape, is tightened between said head-body and a spacer element defining said spacer chamber, interposed between the control cylinder of said cleaning member and said head body, wherein said fixing elements comprise screw elements arranged to fix said spacer element, and thus said spacer chamber to said head-body, and wherein said shoulder zone is received in a seat obtained on said head-body and/or on said spacer element.

7. The high-pressure mixing device according to claim 6, wherein said seat is entirely obtained on said head-body such as to entirely house said shoulder zone leaving one of its outer end surfaces exposed adapted to receive a tightening pressure by said spacer element against the upper surface of said head-body.

8. The high-pressure mixing device according to claim 6, wherein said seat is partly obtained on said head-body and partly on the lower end of said spacer element such that said shoulder zone is partially housed in said head-body and protrudes therefrom to be partially contained in said spacer-element, said shoulder zone being thus astride the interface surface in between the head-body and said spacer element.

9. The high-pressure mixing device according to claim 6, further comprising a cavity for radially centering said tubular element through pin or key, said cavity being obtained in said shoulder zone and in the seat arranged to receive said pin or key.

10. The high-pressure mixing device according to claim 1, wherein said shoulder zone extends, with an annular or flange shaped, radially from an intermediate zone of said tubular element and it is configured to lay on a surface of said head-body in a position opposite with respect to said upper end.

11. The high-pressure mixing device according to claim 1, wherein said locking elements comprise screw elements arranged to directly engage with said shoulder zone to removably fix it to said head-body.

12. The high-pressure mixing device according to claim 1, wherein said fixing elements comprise a threaded annular element configured to engage with a threaded surface obtained on a zone of said tubular element in position opposite to said shoulder zone, and to abut on a surface of said head-body.

13. The high-pressure mixing device according to claim 1, wherein said sealing elements comprise annular sealing elements housed in respective annular seats obtained on the surface of said tubular element and/or on the cylindrical surface of said pass-through hole obtained in said head-body, said annular sealing elements being configured to avoid any leakage of polymeric mixture and reactive components from said mixing chamber through the interface between said head-body and said tubular element towards said spacer chamber and/or outwardly and to avoid any leakage of lubricant liquid from said spacer chamber towards said mixing chamber.

14. The high-pressure mixing device according to claim 1, wherein in said intermediate transversal hole provided on said tubular element there is obtained by interpolation of tool machine axis said annular seat with annular counter bore constant section or said annular seat with concentric annular double counter bore that is arranged coaxially with said intermediate transversal hole on the outer surface of said tubular element, said seat extending saddle-shaped or plane-shaped in the thickness of said tubular element such as to be open on a side and facing the surface delimiting said pass-through hole of said head-body housing said tubular element, said elastic or elasto-plastic sealing element being adapted to interact with interference with said valve member and being housed with interference between said longitudinal surface of the pass-through hole and the other surfaces of said annular seat shaped as a saddle or as a saddle followed by cylindrical counter bore.

15. The high-pressure mixing device according to claim 1, wherein said elastic or elasto-plastic sealing element comprises recess zones and relief zones, configured to increase the specific contact and coupling pressure with said annular seat and to increase pressure and a hydraulic sealing action towards the surface of the pass-through hole transversal with respect to the head-body and the hydraulic sealing action towards the surfaces which delimit said seat housing said element, and to increase the hydraulic sealing action in the interaction with the front cylindrical surface of the valve member.

16. The high-pressure mixing device according to claim 1, wherein said elastic or elasto-plastic sealing element comprises, on the outer surfaces, recess zones and relief zones, with one or two or four cusps having triangle, bevelled triangle or trapezoidal shape, configured to increase the specific contact and coupling pressure with said annular seat and to increase a hydraulic sealing action towards the surface of the pass-through hole of the head-body and the hydraulic sealing action towards the surfaces of the cavity or cavities housing said sealing element and the hydraulic sealing action in the interaction with the cylindrical surface of the valve member, and wherein the outer surface of said sealing element comprises a transversal profile with one or two or four triangle- or trapezoidal shape cusps to increase the specific pressure on the surfaces of the cavity and better adapt by deformation to the roughness and tolerances of the surfaces intended to receive said sealing element.

17. The high-pressure mixing device according to claim 1, wherein the outer surface of said sealing element comprises a peripheral profile configured as a saddle to ensure the sealing action even in the coupling zone between outer surface of said tubular element and said pass-through hole of said head-body.

18. The high-pressure mixing device according to claim 1, wherein said annular sealing element has peripheral surfaces conformed to couple with cylindrical shapes and has one of the side surfaces configured to couple according to the saddle shape deriving from the intersection between two cylinders of different radius to exert the sealing action at the seat with counter bore surface in the coupling zone between its outer surface and the surface delimiting said pass-through hole obtained transversally to said head-body.

19. The high-pressure mixing device according to claim 1, wherein said sealing element is provided with an annular peripheral relief configured according to the saddle shape deriving from the intersection between two orthogonal cylinders of different radius to increase the surface and the sealing action even in the zone at the concentric double counter bore that defines said annular seat, in the coupling zone between the outer surface of said tubular element and the surface that delimits said pass-through hole obtained in said head-body.

20. The high-pressure mixing device according to claim 1, wherein in said head-body in said tubular element, in a position diametrically opposite and in front of said mixing chamber and of said intermediate transversal hole, an additional transversal pass-through hole is obtained occupied and sealed, during normal functioning, by a cap, said additional transversal pass-through hole allowing, once said cap is removed, to apply to the head-body an additional valve element for inletting washing or inerting liquids or gases in order to wash for example a possible flexible extension duct of the delivery duct or to inject an inerting gas into the cavity of the mould in which the reacting resin is injected, between the surface of said cap and the surface of said additional hole being defined a respective gap where elastic sealing elements are interposed to avoid any leakage of mixture or lubricant liquid towards said additional hole.

21. A method for manufacturing a high-pressure mixing device for mixing a first and at least a second chemically-reactive liquid component, wherein there is provided to:
  configure a delivery duct as a tubular element made in a single piece, having an upper end open and communicating with a spacer chamber and a lower end open for delivering the reactive mixture and wherein said tubular element can be processed separately with respect to an head-body and is inserted and removably fastened-to allow an easy removal—in a pass-through hole obtained in said head-body,
  obtain on said tubular element, before inserting it into said head-body, an intermediate transversal hole intended, in an assembled configuration, to extend said mixing chamber with an increased diameter such that a mixing chamber extends until it leads into a delivery chamber delimited within said tubular element;
  configure said intermediate transversal hole with a first diameter greater than a second diameter of said mixing chamber to compensate for, while assembling, mutual geometrical positioning errors due to processing tolerances and avoid the presence of steps and zones interfering with the movement of a valve member slidingly movable in said mixing chamber, said intermediate transversal hole being configured as an extension of said mixing chamber and conformed to internally receive the front end part of said valve member in an advanced position;
  obtain on the cylindrical surface of said intermediate traversal hole, in the thickness of said tubular element, an annular seat;

house and compress forcedly in said annular seat a sealing element of suitable shape to be inserted with interference towards all the surfaces of said annular seat, so as to exert the function of hydraulic sealing against leakages of reactive components from longitudinal recirculation slots towards said delivery duct and against leakages of lubricant liquid from the gap—defined between a stem of a control cylinder of a cleaning member and said tubular element—towards said longitudinal slots when the front end part of said valve member is in said advanced position;

configure said tubular element with an annular shoulder zone placed at a zone distant from said intermediate transversal hole, and removably fix, by fixing and orienting elements, said annular shoulder zone to a side surface of said head-body to lock up in the correct position said tubular element in said pass-through hole, wherein it is provided to define between said tubular element and said pass-through hole of said head body a clearance gap to limit the contact area and avoid sticking by interference of said tubular element with said head-body, to facilitate the insertion into, and easy removal of said tubular element from said pass-through hole, and provide sealing gasket elements configured to avoid any leakage of polymeric mixture and of reactive components from said mixing chamber towards the interface between said head-body and said tubular element and towards said spacer chamber and to avoid any leakage of lubricant liquid from said spacer-chamber towards said mixing chamber.

22. The method according to claim 21, wherein said annular seat is obtained in the cylindrical surface of said intermediate transversal hole entirely in the thickness of said tubular element, said annular seat extending circularly entirely in the thickness gf said tubular element without protruding from one of the longitudinal cylindrical walls of said tubular element to house said sealing element said sealing element made of elastic material having a constant section and being toroidal-shaped.

23. The method according to claim 21, wherein it is provided to forcedly house and compress in said annular seat a sealing element of suitable shape to be inserted with interference towards all the surfaces of said seat, so as to exert a hydraulic sealing function against leakages of the reactive components from said recirculation longitudinal slots towards said delivery duct and against leakages of lubricant liquid from the gap-defined between the stem of said cleaning member and said tubular element—towards said longitudinal slots when the front end cylindrical part of said valve member is in said advanced position, wherein it is provided to obtain by interpolation—in the surface delimiting said intermediate transversal hole and towards the surface delimiting said pass-through hole—said annular seat so as to define a saddle shape with constant section or counter bore or a saddle shape with coaxial plane counter bore with a reduced diameter counter bore, so that it is open on a side and facing the surface that delimits said pass-through hole, said seat being conformed to house the elastic or elasto-plastic sealing element which is forcedly housed and compressed in its own seat, so as to exert the hydraulic sealing function against leakages of the reactive components from said recirculation longitudinal slots towards said delivery duct and towards the gap defined between the tubular element and said pass-through hole and to avoid leakages of lubricant liquid from the gap—defined between the stem of said cleaning member and said tubular element—towards said longitudinal slots when the front end part of said valve member is in said advanced position.

* * * * *